United States Patent [19]

Kumagai et al.

[11] Patent Number: 5,378,024

[45] Date of Patent: Jan. 3, 1995

[54] QUICK CONNECTOR

[75] Inventors: Toshihiro Kumagai, Tajimi; Hirokazu Kitamura, Kasugai; Tsutomu Kodama, Komaki; Kazuhiro Kato, Nagoya, all of Japan

[73] Assignee: Tokai Rubber Industries, Ltd., Komaki, Japan

[21] Appl. No.: 38,981

[22] Filed: Mar. 25, 1993

[30] Foreign Application Priority Data

| Mar. 25, 1992 [JP] | Japan | 4-67457 |
| Dec. 22, 1992 [JP] | Japan | 4-342808 |
| Jan. 28, 1993 [JP] | Japan | 5-012474 |

[51] Int. Cl.$^6$ ............................................. F16L 39/00
[52] U.S. Cl. ................................. 285/39; 285/319; 285/321; 285/921
[58] Field of Search .................. 285/319, 39, 321, 921

[56] References Cited

U.S. PATENT DOCUMENTS

| 3,929,357 | 12/1975 | De Vincent et al. | 285/319 |
| 4,423,892 | 1/1984 | Bartholomew | 285/319 |
| 4,802,696 | 2/1989 | Chohen et al. | 285/319 |
| 4,944,537 | 7/1990 | Usui et al. | 285/319 |
| 4,948,180 | 8/1990 | Usui et al. | 285/319 |
| 4,997,216 | 3/1991 | Washizu | 285/319 |
| 5,112,084 | 5/1992 | Washizu | 285/319 |
| 5,141,264 | 8/1992 | Usui | 285/351 |
| 5,163,719 | 11/1992 | Washizu | 285/319 |

FOREIGN PATENT DOCUMENTS

| 4100498 | 7/1991 | Germany . |
| 58-225290 | 12/1983 | Japan . |
| 4-64689 | 6/1992 | Japan . |
| 2222218 | 2/1990 | United Kingdom . |
| 2236567 | 4/1991 | United Kingdom . |

*Primary Examiner*—Eric K. Nicholson
*Attorney, Agent, or Firm*—Jacobson, Price, Holman & Stern

[57] ABSTRACT

A quick connector comprises a tubular-shaped female member, a tubular-shaped male member, and an engager member which comprises a "C" ring-shaped and tapered stopper whose diameter can be increased in said annular-shaped concave, and which has the smaller diameter ends having the small diameter at the inner side of said female member and having the large diameter at the side of said opened flange to engage said engager projection, and which has the larger diameter ends having the diameter larger than that of said opened flange of said female member to face the inside end surface of said opened flange; a regulator which is installed in the axial direction to said stopper, and which is projected in the centrifugal directions than do the larger diameter ends of said stopper, and which is brought into contact with the inner peripheral surface of said annular-shaped concave to regulate the displacement in the radial direction of said stopper; and a linkage for connecting said stopper and said regulator. In the quick connector, the smooth insertion of the male member and the satisfactory diameter enlargement of the stopper can be obtained.

18 Claims, 12 Drawing Sheets

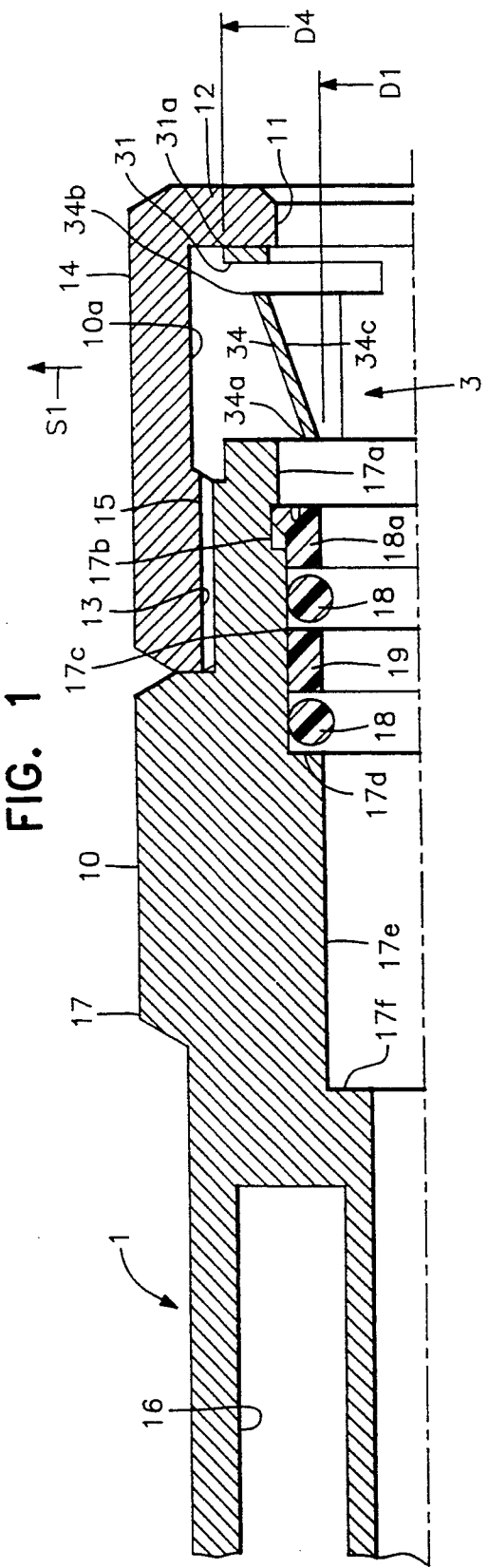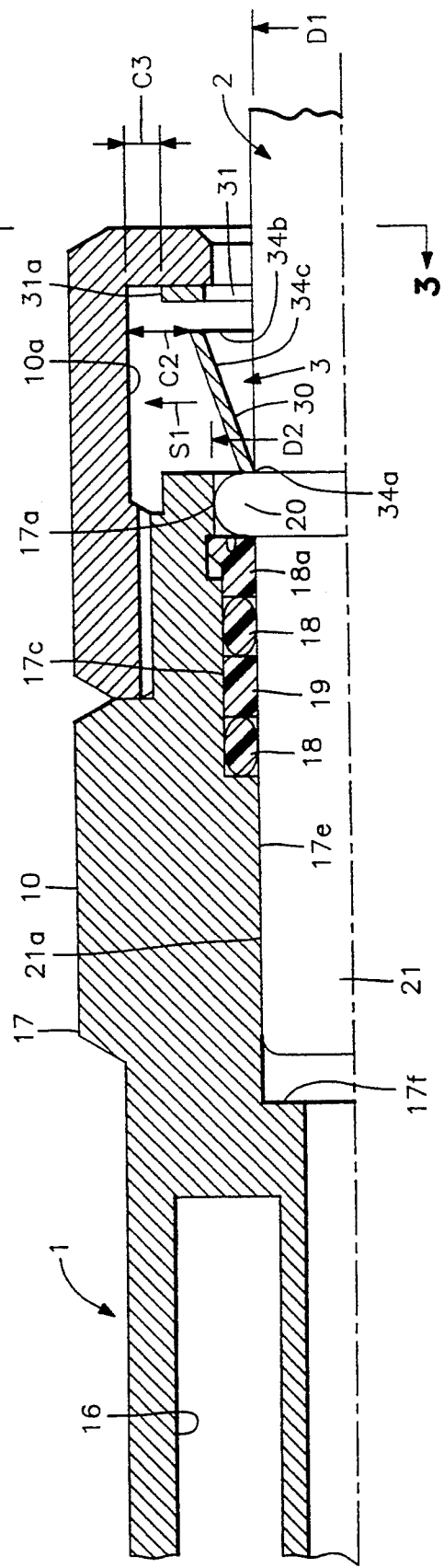

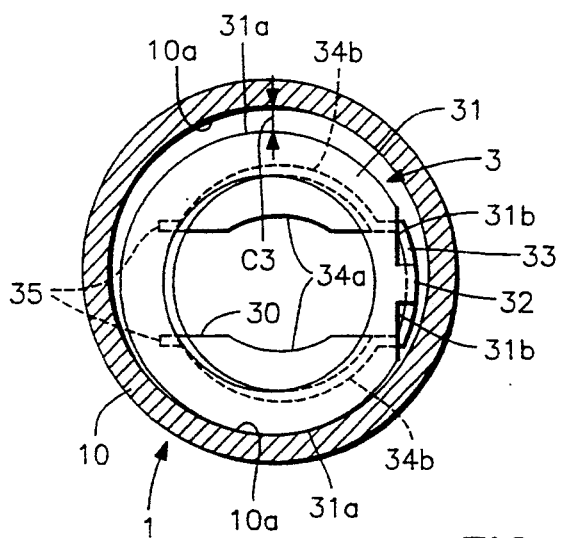
FIG. 3
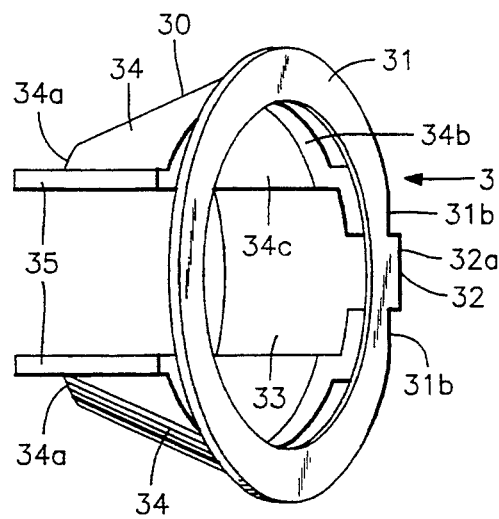
FIG. 4
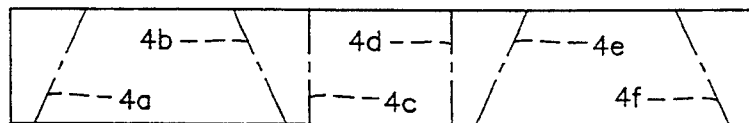
FIG. 5
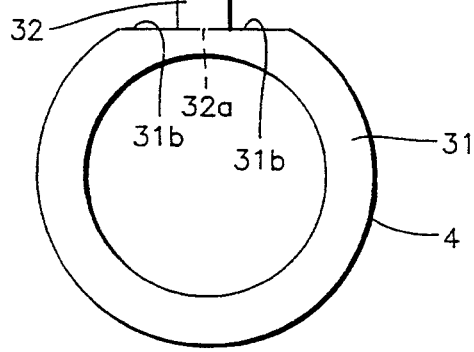
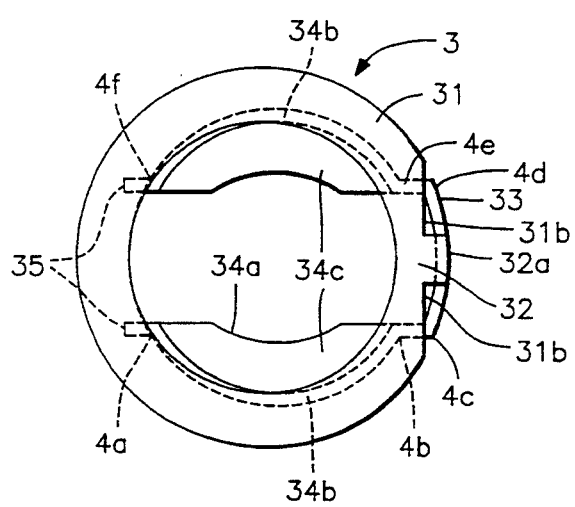
FIG. 6
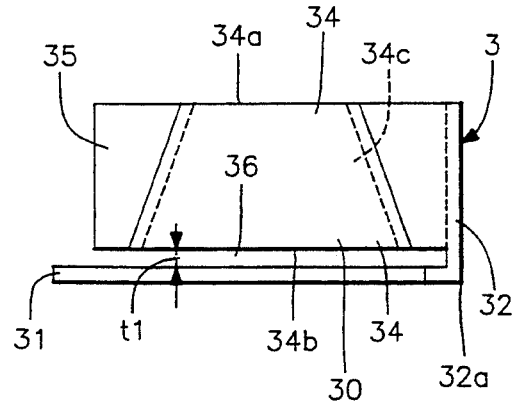
FIG. 7

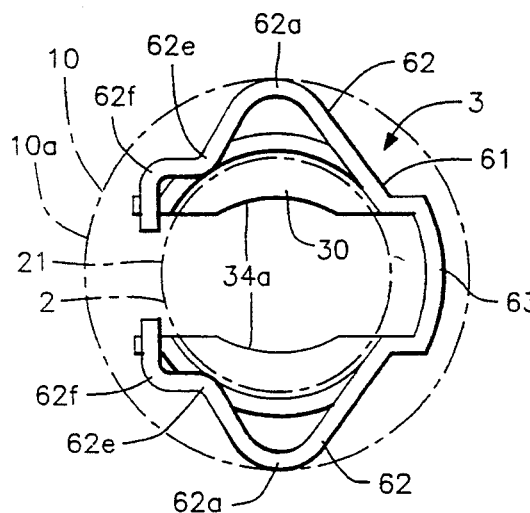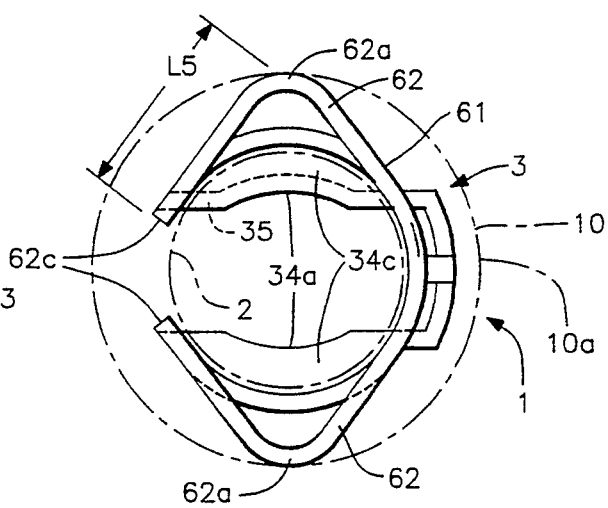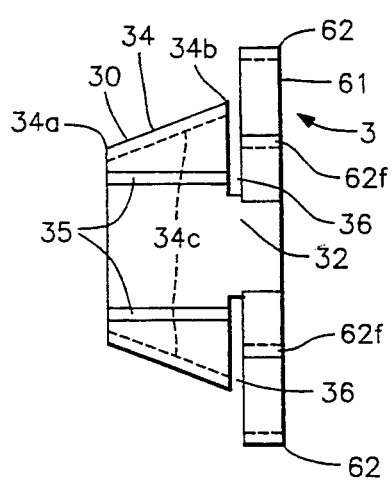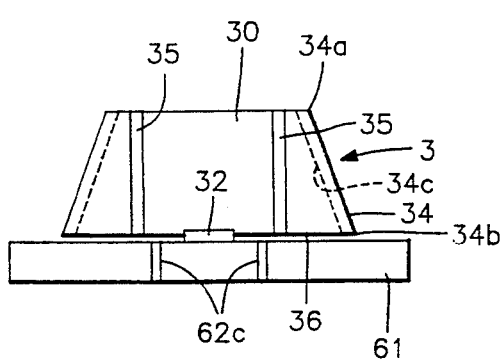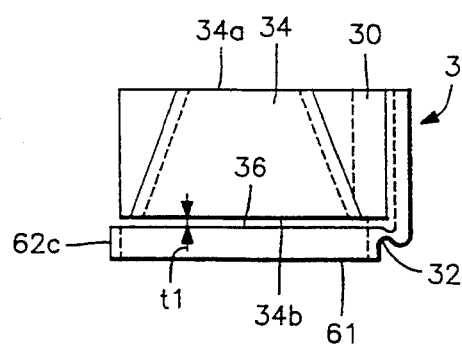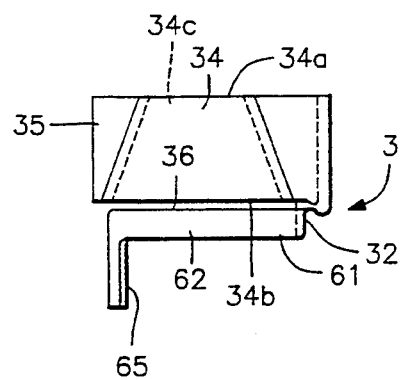

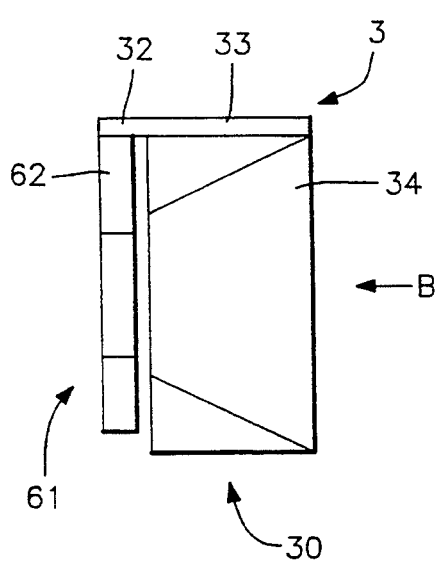
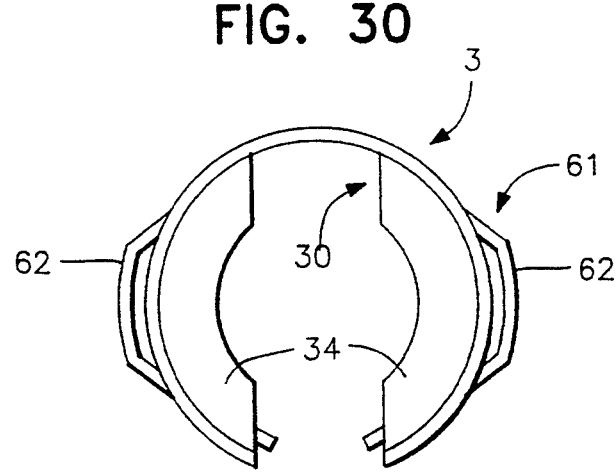
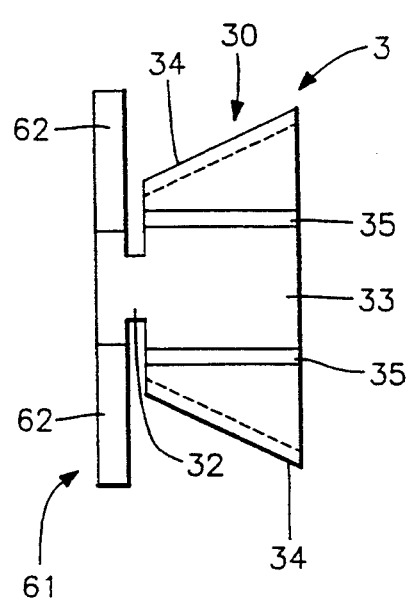
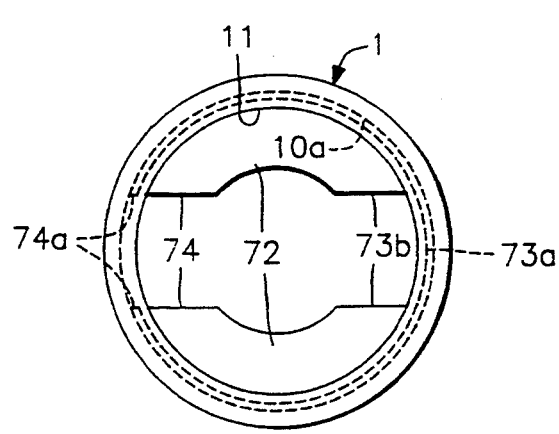

PRIOR ART

QUICK CONNECTOR

BACKGROUND OF THE INVENTION

1. Field of the Invention

The present invention relates to a quick connector having a male member and a female member for piping for connecting hoses or pipes which are employed to transfer a fluid, such as gasoline, oil, water, air and the like, especially relates to a quicker connector having a simple engager member.

2. Description of the Related Art

As disclosed in FIGS. 42 and 43, a conventional quick connector comprises a tubular-shaped female member 100 which includes a receiving tube 102 having a receiving opening 101, a tubular-shaped male member 200 which includes a ring-shaped engager projection 201 projected in the centrifugal directions and an engager tube 202, a "C" shaped engager member 300 disposed in the receiving tube 102 of the female member 100. This is described in U.S. Pat. No. 3,929,357. As illustrated in FIG. 32, the engager member 300 is inserted into the receiving tube 102 through an entry 103 to rigidly fix a middle portion 301 to the receiving tube 102 by a rivet 400. The engager member 300 includes a tapered stopper 302 whose diameter can be increased. The tapered stopper 302 is tapered from one end to the other end in the axial direction, and the one end 302a has a small diameter and the other end 302b has a large diameter.

The male member 200 is inserted into the receiving tube 102 of the female member 100 in the direction of the arrow "S8" through the opened flange 101, and the engager projection 201 of the male member 200 is pressed against the stopper 302 on the inner surfaces. Accordingly, the stopper 302 are deformed in the centrifugal direction (e.g., in the direction of the arrow "S7", shown in FIG. 42) so as to increase the diameter. Thus, the engager projection 201 goes over the engager member 300, and it is disposed in the inner side with respect to the engager member 300. Then, the stopper 302 of the engager member 300 whose diameter has been increased is restored to its original shape by its own elasticity in the direction reducing the diameter, thereby engaging the engager projection 201 with the engager member 300. Finally, the male member 200 is connected to the female member 100.

As disclosed in FIGS. 44 and 45, the other conventional quick connector comprises a female member 100 which includes a a receiving tube 102 having a receiving opening 101 on one end in the axial direction, a male member 200 which includes a ring-shaped engager projection 201 projected in the centrifugal directions with a tapered surface 203 and an engager tube 202, a "U" shaped engager member 300 bent at the middle portion 301 so that one end portion 303 faces to the other end portion 303. This is described in Japanese Laid-Open Patent Publication No. 225290/1983.

As illustrated in FIGS. 42 and 45, in the above conventional quick connector, the middle portion 301 of the engager member 300 is outwardly projected from the entry 103, and the both end portions 303 of the engager member 300 are outwardly projected from a retainer 104. Therefore, the middle portion 301 and the both end portions 303 of the engager member 300 is likely to collide or interfere with the other component members, and the engager member 300 is likely to come off.

As illustrated in FIG. 46, inventors have found a new type of quick connector in which the "C" shaped engager member 300 is installed in the receiving tube 102 of the female member 100. The quick connector is disclosed in Japanese Patent Application No. 109419/1990. The quick connector requires a clearance C1 in the radial directions between the engager member 300 and the inner peripheral surface of the receiving tube 102 since the tapered stopper 302 of the engager member 300 is extended in the receiving tube 102. When the clearance C1 is small, the diameter of the tapered stopper 302 of the engager member 300 cannot be fully increased. When the clearance C1 is large, the engager member 300 is largely displaced with respect to the receiving tube 102. Therefore, when the male member 200 is inserted into the receiving tube 102 of the female member 100, the engager member 300 deteriorates the smooth insertion of the male member 200. Furthermore, the satisfactory diameter enlargement of the tapered stopper 302 is also deteriorated.

SUMMARY OF THE INVENTION

The present invention was completed to overcome the above-mentioned disadvantage.

It is an object of the present invention is to provide a quick connector which solves the disadvantage caused by that the engager member collides or interferes with the other component members, and which solves the large displacement between the engager member and the receiving tube. Hence, it is possible to obtain the smooth insertion of the male member and the satisfactory diameter enlargement of the tapered stopper of the engager member.

One type of quick connector according to the present invention comprises a tubular-shaped female member having an opened flange which is projected in the centripetal directions and installed at an opening end on one side in the axial direction, and an annular-shaped concave which is adjacent to and inside the opened flange and whose inner diameter is larger than that of the opened flange; a tubular-shaped male member which has a ring-shaped engager projection projected in the centrifugal directions at the predetermined distance from the top end, and which is inserted into the annular-shaped concave through the opened flange; an engager member which is hold in the annular-shaped concave of the female member, and has the spring elasticity for connecting the female member and the male member inserted into the annular-shaped concave. The engager member comprises a "C" ring-shaped and tapered stopper whose diameter can be increased in the annular-shaped concave, and which has the smaller diameter ends having the small diameter at the inner side of the female member and having the large diameter at the side of the opened flange to engage the engager projection, and which has the larger diameter ends having the diameter larger than that of the opened flange of the female member to face the inside end surface of the opened flange; a regulator which is installed in the axial direction to the stopper, and which is projected in the centrifugal directions than do the larger diameter ends of the stopper, and which is brought into contact with the inner peripheral surface of the annular-shaped concave to regulate the displacement in the radial direction of the stopper; and a linkage for connecting the stopper and the regulator.

The male member is relatively inserted into the annular-shaped concave of the female member through the opened flange, and the engager projection of the male member is pressed against the stopper of the engager member on the inner surfaces. Accordingly, the stopper is deformed in the cetrifugal directions so as to increase the diameter. Thus, the engager projection of the male member goes over the stopper of the engager member, and it is disposed in the inner side with respect to the engager member. Then, the stopper of the engager member whose diameter has been increased is restored to its original shaped by its own elasticity in the direction reducing the diameter, thereby engaging the engager projection of the male member with the smaller diameter ends of the stopper of the engager member. Finally, the male member is connected to the female member. Under the connection thus established, even when one tries to separate the male member and female member relatively, they cannot be separated apart because the smaller diameter ends of the stopper of the engager member and the engager projection of the male member are engaged with each other, and because the larger diameter ends of the stopper and the inside end surface of the opened flange are engaged with each other directly or indirectly.

When the female member and the male member are connected, the engager member adapted for connecting them is accommodated in the annular-shaped concave of the female member. Hence, the engager member hardly collides or interferes with the other component members.

The regulator of the engager member is projected in the centrifugal directions than do the larger diameter ends of the stopper before the engaging tube of the male member is inserted into the annular-shaped concave of the female member. Consequently, the regulator is likely to be brought into contact with the inner peripheral surface of the annular-shaped concave of the female member, and thereby the stopper can be prevented from displacing in the radial directions. Hence, when the male member is connected to the female member, the diameter of the stopper of the engager member is fully increased, and there can be secured the sufficient clearance between the annular-shaped concave and the stopper so that the engager projection of the male member goes over the stopper of the engager member. At the same time, the stopper of the engager member can be displaced less or prevented from displacing in the radial directions relatively with respect to the annular-shaped concave of the female member. As a result, it is possible to ensure the smoother insertion of the male member into the female member and the satisfactory diameter enlargement of the stopper of the engager member.

Another type of quick connector according to the present invention comprises a tubular-shaped female member having an opened flange which is projected in the centripetal directions and installed at an opening end on one side in the axial direction, and an annular-shaped concave which is adjacent to and inside the opened flange and whose inner diameter is larger than that of the opened flange; a tubular-shaped male member which has a ring-shaped engager projection projected in the centrigugal directions at the predetermined distance from the top end, and which is inserted into the annular-shaped concave through the opened flange; an engager member which is hold in the annular-shaped concave of the female member, and has the spring elasticity for connecting the female member and the male member inserted into the annular-shaped concave. The engager member comprises a "C" ring-shaped and tapered stopper whose diameter can be increased in the annular-shaped concave, and which has the smaller diameter ends having the small diameter at the inner side of the female member and having the large diameter at the side of the opened flange to engage the engager projection, and which has the larger diameter ends having the diameter larger than that of the opened flange of the female member to face the inside end surface of the opened flange; a regulator having a pair of arms whose diameter can be reduced, and which is installed in the axial direction to the stopper, and which is projected in the centrifugal directions than do the larger diameter ends of the stopper, and which is brought into contact with the inner peripheral surface of the annular-shaped concave to regulate the displacement in the radial direction of the stopper; and a linkage for connecting the stopper and the regulator. The engager member is inserted through the opened flange of the female member by reducing the diameter of the stopper and the regulator.

In the above mentioned quick connector, the regulator of the engager member has a pair of arms whose diameter can be reduced. In other words, when inserting the engager member into the annular-shaped concave through the opened flange of the female member, a pair of arms are approached each other so as to decrease the diameter, and then the diameter of the "C" ring-shaped stopper is reduced. Therefore, in this type of quick connector, it is unnecessary to detachably install a tube which has the opened flange at one side in the axial direction so that the engager member is installed in the annular-shaped concave of the female member. It is possible to form the female member integrally, so the construction of the female member comes to be compact.

The other type of quick connector according to the present invention comprises a tubular-shaped female member having an opened flange which is projected in the centripetal directions and installed at an opening end on one side in the axial direction, and an annular-shaped concave which is adjacent to and inside the opened flange and whose inner diameter is larger than that of the opened flange; a tubular-shaped male member which has a ring-shaped engager projection projected in the centrifugal directions at the predetermined distance from the top end, and which is inserted into the annular-shaped concave through the opened flange; an engager member which is hold in the annular-shaped concave of the female member, and has the spring elasticity for connecting the female member and the male member inserted into the annular-shaped concave. The engager member comprises a "C" ring-shaped larger diameter ends which are opposed to the inside end surface of the opened flange of the female member, and which are brought into contact with the inner peripheral surface of the annular-shaped concave, and which has the outer diameter being larger than the opening diameter of the opened flange and being almost equal to the inner diameter of the annular-shaped concave; plural tapered walls which are arranged in the circumferential direction, and which are tapered coaxially with respect to the "C" ring-shaped larger diameter ends from the "C" ring-shaped larger diameter ends to the inner side of female member, and which has the smaller diameter ends having the inner diameter smaller than the outer diameter of the engager projection of the male member to engage the engager projection; at least one of linkages for extending from the "C" ring-shaped larger diameter ends to the smaller diameter ends to connect tapered walls and having a top wall which is extended from the "C" ring-shaped larger diameter ends to the smaller diameter ends in parallel to the axis and in which both peripheral ends are brought into contact with the inner peripheral surface of the annular-shaped concave having the diameter almost equal to the outer diameter of the "C" ring-shaped larger diameter ends, and a pair of linkage walls which are extended downwardly and in parallel from the both peripheral ends of the top wall and in which each linkage wall is connected to each one peripheral end of the tapered walls; a pair of leading walls which are extended from the "C" ring-shaped larger diameter ends to the smaller diameter ends and in which each leading wall is connected to the other peripheral end of the tapered walls, and which has peripheral end contacts extended from the "C" ring-shaped larger diameter ends to the smaller diamter ends and brought into contact with the inner peripheral surface of the annular-shaped concave whose diameter is equal to the outer diameter of the "C" ring-shaped larger diameter ends.

With respect to the female member holding the engager member in its annular-shaped concave, the male member is relatively inserted into the annular-shaped concave of the female member through the opened flange, and the engager projection of the male member is pressed against the engager member on the inner peripheral surfaces of the tapered walls. Accordingly, the tapered walls are deformed elastically so as to warp radially outwardly at the smaller diameter ends. At this moment, the engager member is brought into contact with the annular-shaped concave of the female member at the "C" ring-shaped larger diameter end, at the both peripheral ends of the top wall of the linkage, and at the peripheral and contacts of the pair of the leading walls. Thus, the engager member can be held securely in the annular-shaped concave of the female member and concentrically therewith. Thereby it cannot be displaced in the radial directions at all when the tapered walls of the engager member are deformed elastically by the engager projection of the male member. Accordingly, the insertion of the male member into the female member can be carried out with a remarkably good operability.

When the male member is further inserted into the female member, the engager projection of the male member goes over the engager member, and it is disposed in the inner side of the female member with respect to the engager member. Then, the tapered walls which have been elastically deformed radially outwardly are restored to the original shapes by their own resilient forces. Accordingly, the male member is engaged with the smaller diameter ends of the tapered walls of the engager member at the engager projection, the female member is engaged with the "C" ring-shaped larger diameter end of the engager member at the inside end surface of the opened flange and the inner peripheral surface of the annular-shaped concave, and the engager member is engaged with the inner peripheral surface of the annular-shaped concave of the female member at the both peripheral ends of the top wall of the linkage and at the peripheral end contacts of the leading end walls. As a result, the male member is connected to the female member.

When the female member and the male member are connected, the engager member adapted for connecting them is accommodated in the annular-shaped concave of the female member. Hence, the engager member hardly collides or interferes with the other component members.

The male member and the female member can be securely prevented from moving relatively in the axial directions because the engager member is engaged with the engager projection of the male member at the smaller ends of the tapered walls, and because the engager member is engaged with the inside end surface of the opened flange of the female member at the "C" ring-shaped larger diameter end. Further, on the smaller diameter ends side of the tapered walls of the engager member, the smaller diameter ends of the tapered walls are held in the directions perpendicular to the axial direction between the linkage wall of the linkage and the leading walls which are regulated by the inner peripheral surface of the annular-shaped concave of the female member. As a result, when a large axial force is exerted to the female member and the male member so as to separate them apart, the engager member can adequately receive the large axial force from the engager projection of the male member at the smaller diameter ends of the tapered walls so that it is not buckled at all.

In addition, the engager member is brought into contact with the inner peripheral surface of the annular-shaped concave of the female member at at least both peripheral ends of the top wall of the "C" ring-shaped larger diameter end and the peripheral end contacts of the pair of the leading end walls thereof, and the tapered walls are regulated in the directions perpendicular to the axial direction by the linkage wall of the linkage and the leading walls. Consequently, the engager member cannot be moved idly or loosened.

Hence, the female member and the male member can be firmly connected and held together by way of the engager member.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 1 is a cross-sectional view for showing the principal part of the female member.

FIG. 2 is a cross-sectional view for showing the condition that the male member is connected to the female member.

FIG. 3 is a Y1 to Y1 cross-sectional view of FIG. 2.

FIG. 4 is a diagonal view for showing the engager member.

FIG. 5 is a development for showing the engager member.

FIG. 6 is a front view for showing the engager member.

FIG. 7 is a plane view for showing the engager member.

FIG. 12 is a front view for showing the engager member according to the Third Preferred Embodiment.

FIG. 13 is a side view for showing the engager member according to the Third Preferred Embodiment.

FIG. 14 is a plane view for showing the engager member according to the Fourth Preferred Embodiment.

FIG. 15 is a front view for showing the engager member according to the Fourth Preferred Embodiment.

FIG. 16 is a side view for showing the engager member according to the Fourth Preferred Embodiment.

FIG. 17 is a plane view for showing the engager member according to the Fifth Preferred Embodiment.

FIG. 29 is a side view for showing the engager member according to the Eighth Preferred Embodiment.

FIG. 30 is a B-view front view for showing the engager member according to the Eighth Preferred Embodiment.

FIG. 31 is a base view for showing the engager member according to the Eighth Preferred Embodiment.

FIG. 35 is a X-view of FIG. 1 according to the Ninth Preferred Embodiment.

DETAILED DESCRIPTION OF THE PREFERRED EMBODIMENTS

Figure 8:
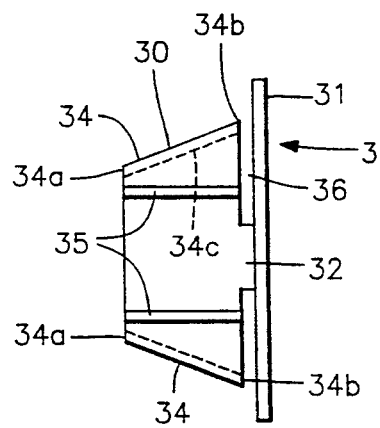
FIG. 8 is a side view for showing the engager member.

Having generally described the present invention, a further understanding can be obtained by reference to the specific preferred embodiments which are provided herein for purposes of illustration only and are not intended to limit the scope of the appended claims.

First Preferred Embodiment

A quick connector according to a First Preferred Embodiment of the present invention will be hereinafter described with reference to FIGS. 1 through 8.

As illustrated in FIGS. 1 and 2, the quick connector according to the First Preferred Embodiment comprises a female member 1 formed in a cylinder, including a receiving tube 10 and made of metal, a male member 2 formed in a cylinder and made of metal, and engager member 3 disposed in the female member 2 and made of leaf spring steel.

The receiving tube 10 of the female member 1 includes a first tube 14 having a female threaded portion 13, and a second tube 17 having a male threaded portion 15. The first tube 14 and the second tube 15 are connected detachably by screwing. The first tube 14 inlcudes an opened flange 12 disposed on an opened end side in the axial direction and projecting in the centripetal directions. The inner peripheral surface of the opened flange 12 is adapted to form a receiving opening 11 in a simple circle. In the inner side of the opened flange 12, there is formed an annular-shaped concave 10a which is disposed adjacent to the opened flange 12 and which has an inside diameter larger than the opened diameter (i.e., the inside diameter) of the opened flange 12. The second tube 17 includes a hose inserting groove 16 formed in a cylinder. In the inner peripheral surface of the second tube 17, there are formed a ring-shaped regulatory surface 17a, a ring-shaped groove 17b, a sealing surface 17c, a stepped surface 17d and a ring-shaped engaging surface 17e and a stepped surface 17f. On the sealing surface 17c, there are held sealing rings 18, 18, a snap retainer ring 18a and a collar 19.

As illustrated in FIG. 2, the male member 2 includes a ring-shaped engager projection 20 disposed at a position away from a leading end by a predetermined distance, projecting in the centrifugal directions (e.g., in the direction of "S1"), and an engaging tube 21 disposed ahead of the engager projection 20. As can be appreciated from FIG. 2, the outside diameter of the engaging tube 21 of the male member 2 corresponds to the inside diameter of the engaging surface 17e of the female member 1, and the outside diameter of the engager projection 20 corresponds to the inside diameter of the regulatory surface 17a of the female member 1.

FIG. 4 illustrates the appearance of the engager member 3. The engager member 3 includes a "C" ring-shaped stopper 30, a ring-shaped regulator 31 disposed adjacent to the stopper 30 in the axial direction, and a linkage 32 connecting the stopper 30 and the regulator 31 and formed in a tongue. The stopper 30 includes a pair of tapered walls 34, 34, an intermediate linkage 33 connecting the tapered walls 34, 34 and projections 35, 35 projecting outwardly radially at the circumferential leading ends (or the circumferential cut-off ends) of the tapered walls 34, 34. As best shown in FIG. 1, the engager member 3 is regulated by the opened flange 12 of the receiving tube 10 of the female member 1, and thereby it is accommodated and held in the annular-shaped concave 10a. When accommodating the engager member 3 therein and when removing it therefrom, the first tube 14 and the second tube 17 are separated. As illustrated in FIG. 1, the tapered walls 34 of the engager member 3 are tapered to a smaller diameter in the direction toward the inner side of the receiving tube 10, and they are tapered to a larger diameter in the direction toward the opened flange 12. As illustrated in FIG. 2, the inside diameter between the smaller ends 34a of the tapered walls 34 is designated by "D1," the outside diameter of the engager projection 20 of the male member 2 is designated at "D2," and "D1" is set smaller than "D2" (i.e., "D1"<"D2").

Turning back to FIG. 1, the outside diameter of the regulator 31 of the engager member 3 is designated at "D4," and "D4" is adapted to be larger than the outside diameter between the larger diameter ends 34b of the tapered walls 34. In other words, the outer end 31a of the regulator 31 is projected in the centrifugal directions (e.g., in the direction of the arrow "S1") than do the larger diameter ends 34b of the tapered walls 34. Accordingly, as can be understood from FIG. 2, although there is provided a larger clearance "C2" between the larger diameter ends 34b of the tapered walls 34 and the annular-shaped concave 10a of the receiving tube 10, there is provided a smaller clearance "C3" between the outer end 31a of the regulator 31 and the annular-shaped concave 10a. With this construction, the outer end 31a of the regulator 31 is likely to be brought into contact with the annular-shaped concave 10a of the receiving tube 10. When the outer end 31a of the regulator 31 is brought into contact with the annular-shaped concave 10a of the receiving tube 10, the stopper 30 can be prevented from displacing in the radial directions.

The engager member 3 is manufactured as follows. First, a spring steel plate is punched out so as to prepare a punched workpiece 4 as illustrated in FIG. 5. Then, the punched workpiece 4 is bent along the bending lines 4a through 4f so as to form the substantially "C"-shaped stopper 30, and it is also bent along the bending line 32a in the linkage 32 so as to form the engager member 3 as illustrated in FIG. 4. The thus manufactured engager member 3 is illustrated in FIGS. 6 through 8. As illustrated in FIG. 6, linear portions 31b are formed in the regulator 31. In this First Preferred Embodiment, the regulator 31 and the stopper 30 are disposed eccentrically. As illustrated in FIGS. 7 and 8, there is provided a minute clearance 36 between the stopper 30 and the regulator 31 in the axial direction. It is preferred that the dimension "t1" of the minute clearance 36 is as small as possible.

Naturally, the engager member 3 can be formed of resin such as nylon, or the like.

The operations of the quick connector of the First Preferred Embodiment will be hereinafter described together with the usage. With respect to the female member 1 holding the engager member 3 therein as described above, the engaging tube 21 of the male member 2 is first inserted into the annular-shaped concave 10a of the receiving tube 10 of the female member 1 through the opened flange 12, and the engager projection 20 of the male member 3 is pressed against the stopper 30 of the engager member 3 on the inner surfaces 34c of the tapered walls 34. Accordingly, the tapered walls 34 are deformed in the centrifugal directions (e.g., in the direction of the arrow "S1") so as to increase the diameter. Thus, the engager projection 20 goes over the stopper 30 of the engager member 3, and it is disposed in the inner side of the female member 1 with respect to the engager member 3. Then, the tapered walls 34 whose diameter has been increased are restored to their original shapes by its own elasticity in the direction reducing the diameter, thereby engaging the engager projection 20 with the smaller diameter ends 34a of the tapered walls 34 as illustrated in FIG. 2. Finally, the male member 2 is connected to the female member 1. Under the connection thus established, even when one tries to separate the male member 2 and female member 1 relatively, they cannot be separated apart because the engager projection 20 and the smaller ends 34a of the tapered walls 34 are engaged with each other, and because the engager member 3 is deformed in the axial direction so as to bring the larger diameter ends 34b of the tapered walls 34 into contact with the regulator 31 and to eventually engage the larger diameter ends 34 with the inside end surface of the opened flange 12 by way of the regulator 31.

Figure 9:
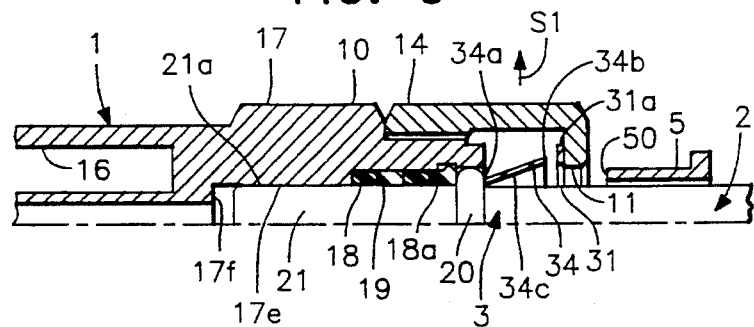
FIG. 9 is a cross-sectional view for showing the principle part when the male member is separated from the female member.

The male member 2 and the female member 1 can be separated as follows. First, as illustrated in FIG. 9, a releasing tube 5 is inserted into the receiving tube 10 through the opened flange 12, and it is pressed onto the inner peripheral surfaces 34c of the tapered walls 34 at the leading end 50. Accordingly, the tapered walls 34 are deformed in centrifugal directions, e.g., in the direction of the arrow "S1," so as to increase the diameter, and thereby the engager projection 20 and the smaller ends 34a of the tapered walls 34 are disengaged. Under the disengagement, the male member 2 and the female member 1 can be separated apart relatively.

As having been described so far and as can be appreciated from FIG. 1, in the First Preferred Embodiment, the outer end 31a of the regulator 31 of the engager member 3 is projected in the centrifugal directions (e.g., in the direction of the arrow "S1") than do the larger diameter ends 34b of the tapered walls 34 before the engaging tube 21 of the male member 2 is inserted into the receiving tube 10 of the female member 1. Consequently, the outer end 31a of the regulator 31 is likely to be brought into contact with the annular-shaped concave 10a of the receiving tube 10, and thereby the stopper 30 can be prevented from displacing in the radial directions.

Hence, before the engaging tube 21 of the male member 2 is inserted into the receiving tube 10 of the female member 1, there is secured the sufficient clearance "C2"

between the larger diameter ends 34b of the tapered walls 34 and the annular-shaped concave 10a of the receiving tube 10, and at the same time the stopper 30 of the engager member 3 is diplaced less or prevented from displacing in the radial directions relatively with respect to the receiving tube 10 of the female member 1. As a result, it is possible to ensure the smooth insertion of the engaging tube 21 of the male member 2 and the satisfactory diameter enlargement of the tapered walls 34 of the stopper 30.

As illustrated in FIG. 2, in the quick connector of the First Preferred Embodiment in which the male member 2 and the female member 1 are connected, the sealing rings 18, 18 maintain the sealing in the boundary area between the male member 2 and the female member 1, and accordingly a fluid can be transferred by way of the tubular male member 2 and the tubular female member 1. As can be seen from FIG. 2, after the quick connector is connected and it is put into the service, the outer peripheral surface 21a of the engaging tube 21 of the male member 2 is opposed to and supported by the engaging surface 17e of the receiving tube 10, and the outer peripheral surface of the engager projection 20 of the male member 2 is opposed to and supported by the regulatory surface 17a of the receiving tube 10. Consequently, the male member 2 and the female member 1 can be prevented from displacing relatively in the directions perpendicular to the axial direction.

Second Preferred Embodiment

A quick connector according to a Second Preferred Embodiment of the present invention will be hereinafter described with reference to FIGS. 10 and 11. The constructions, the operations and the advantageous effects of the Second Preferred Embodiment are identical with those of the First Preferred Embodiment basically, and like component parts will be described with the same reference numerals as those of the First Preferred Embodiment.

Figure 10:
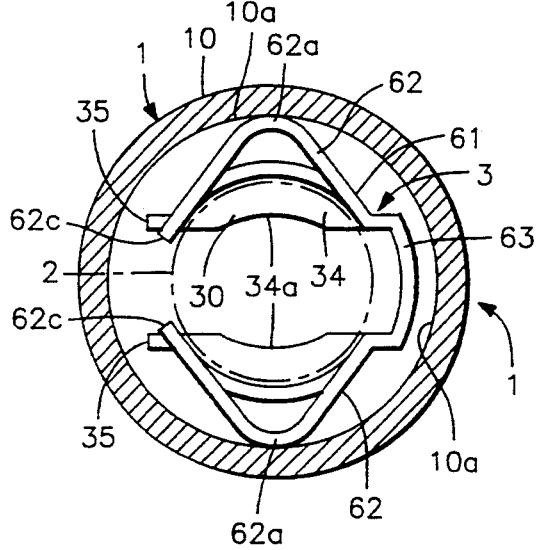
FIG. 10 is a Y2 to Y2 cross-sectional view of FIG. 11.
Figure 11:
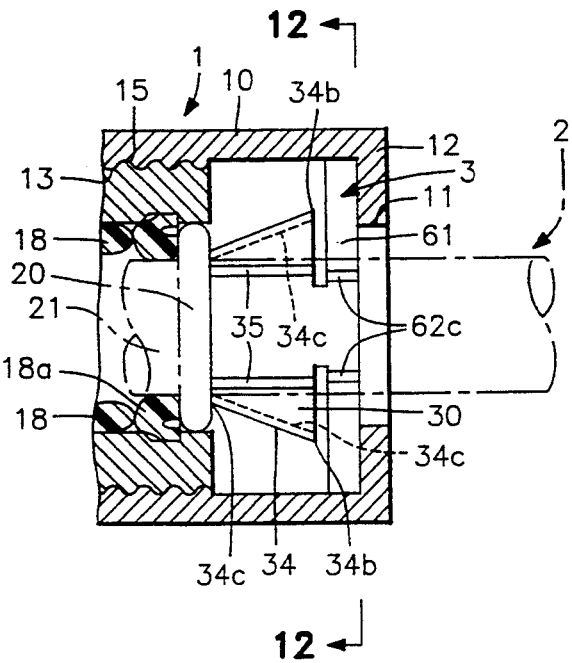
FIG. 11 is a cross-sectional view for showing the principle part according to the Second Preferred Embodiment.

As illustrated in FIG. 10, in the quick connector of the Second Preferred Embodiment, a regulator 61 of the engager member 3 includes two arms 62 projecting in the centrifugal directions and formed in a letter "V" shape, and an intermediate portion 63. The letter "V"-shaped arms 62 are disposed adjacent to or brought into contact with the annular-shaped concave 10a of the receiving tube 10. The leading ends (or the cut-off ends) 62c of the arms 62 are disposed on the same side as the projections 35, and the intermediate outer peripheral ends 62a (or the radially outermost portions 62a) of the arms 62 are opposed in the same direction as the direction in which the stopper 30 is deformed so as to increase the diameter.

The quick connector of the Second Preferred Embodiment operates and produces the advantageous effects as the First Preferred Embodiment does. Additionally, when insulting the engager member 3 into the receiving tube 10 through the opened flange 12 of the female member 1 in the quick connector, the first tube 14 and the second tube 17 of the female member 1 are kept assembled, a pair of the arms 62 are approached each other so as to decrease the diameter, and then the diameter of the tapered walls 34 of the stopper 30 is reduced. In other words, before inserting the engager member 3 into the receiving tube 10, it is unnecessary to disassemble the first tube 14 and the second tube 17 of the receiving tube 10. Hence, it is possible to form the first tube 14 and the second tube 17 integrally.

Third Preferred Embodiment

A quick connector according to a Third Preferred Embodiment of the present invention will be hereinafter described with reference to FIGS. 12 and 13. The constructions, the operations and the advantageous effects of the Third Preferred Embodiment are identical with those of the Second Preferred Embodiment basically.

As illustrated in FIG. 12, in the quick connector of the Third Preferred Embodiment, the regulator 61 includes two arms 62 projecting in the centrifugal directions, and an intermediate linkage portion 63. At the ends of the arms 62, there are further formed a first curved portion 62e and a second curved portion 62f. The first curved portions 62e are disposed adjacent to the outer peripheral surface of the engaging tube 21 of the male member 2, and the second curved portions 62f are disposed adjacent to the annular-shaped concave 10a of the receiving tube 10. The quick connector operates and produces the same advantageous effects as the Second Preferred Embodiment does in general.

Fourth Preferred Embodiment

A quick connector according to a Fourth Preferred Embodiment of the present invention will be hereinafter described with reference to FIGS. 14 and 16. The constructions, the operations and the advantageous effects of the Third Preferred Embodiment are identical with those of the Second Preferred Embodiment basically.

As illustrated in FIG. 15, in the quick connector of the Fourth Preferred Embodiment, the regulator 61 includes two arms 62 projecting in the centrifugal directions at the ends and formed in a letter "V" shaped. The arms 62 are adapted to have a length of "L5," but the length "L5" can be shortened. As illustrated in FIG. 14, the linkage 32 is bent so that it is drawn in toward the stopper 30. Accordingly, the clearance 36 between the stopper 30 and the regulator 61 is made smaller. With the construction, when a reaction force is exerted between the female member 1 and the male member 2 in the axial direction during the service, the stopper 30 and the regulator 31 can be prevented from relatively displacing in the axial direction.

Fifth Preferred Embodiment

A quick connector according to a Fifth Preferred Embodiment of the present invention will be hereinafter described with reference to FIGS. 17 and 19. The constructions, the operations and the advantageous effects of the Fifth Preferred Embodiment are identical with those of the Second Preferred Embodiment basically.

Figure 18:
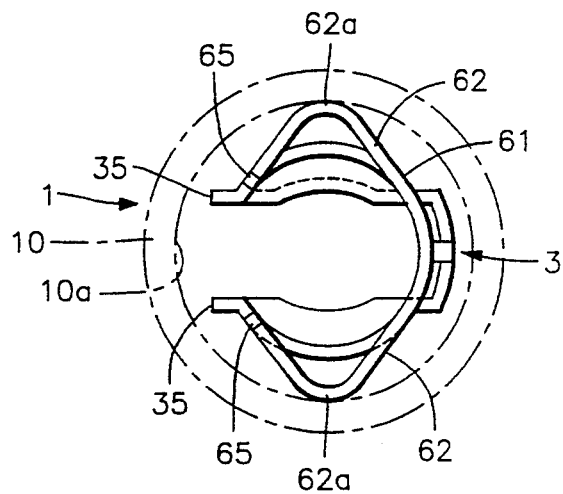
FIG. 18 is a Y4 to Y4 front view of FIG. 19 for showing the engager member according to the Fifth Preferred Embodiment.

As illustrated in FIG. 18, the regulator 61 includes the two arms 62 projecting in the centrifugal directions and formed in a letter "V" shaped. At each leading end of the arms 62, there is provided a grip 65 so as to extend in the axial direction (i.e., two grips 65 are provided in total for the regulator 61 of the engager member 3).

Figure 19:
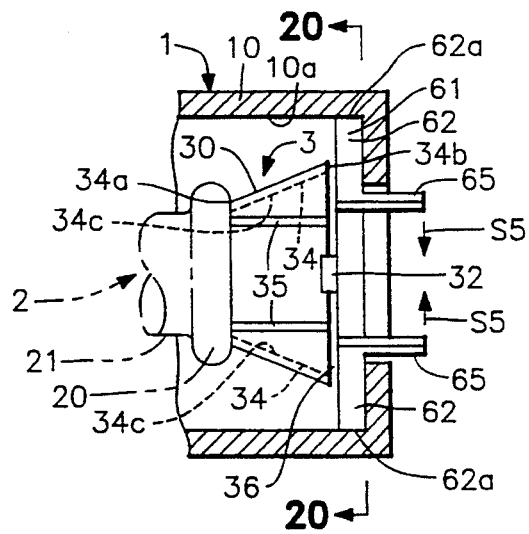
FIG. 19 is a cross-sectional view for showing the principle part when the engager member according to the Fifth Preferred Embodiment is used.

When accommodating the engager member 3 in the receiving tube 10 through the opened flange 12, the grips 65 are approached each other by operating manually or by a robot in the direction of the arrows "S5" illustrated in FIG. 19, and thereby the regulator 61 is deformed so as to decrease the diameter. Accordingly, in the quick connector of the Fifth Preferred Embodiment, the operability is improved during the insertion of the engager member 3 into the receiving tube 10 through the opened flange 12. In addition, the grips 65 of the engager member 3 are extended so as to project from the opened flange 12 of the female member 1, the grips 65 can be approached each other so as to decrease the diameter of the regulator 61 by operating the portions of the grips 65 exposed to the outside. As a result, the engager member 3 can be taken out of the receiving tube 10 of the female member 1, and thereby the female member 1 and the male member 2 can be disintegrated.

Sixth Preferred Embodiment

A quick connector according to a Sixth Preferred Embodiment of the present invention will be hereinafter described with reference to FIG. 20. The constructions, the operations and the advantageous effects of the Sixth Preferred Embodiment are identical with those of the Second Preferred Embodiment basically.

Figure 20:
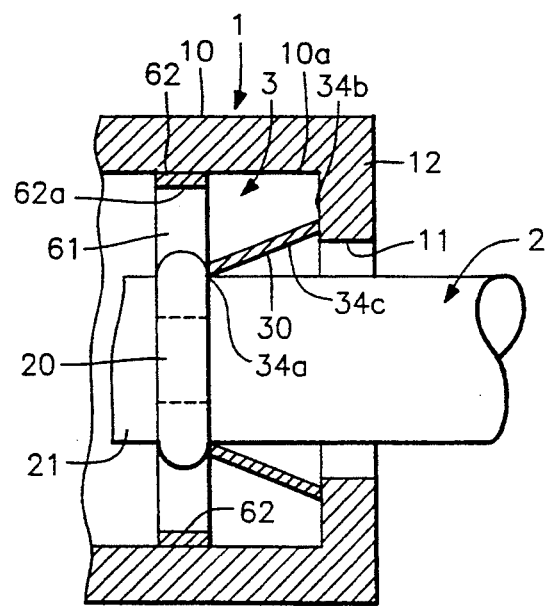
FIG. 20 is a cross-sectional view for showing the principle part when the engager member according to the Sixth Preferred Embodiment.

As illustrated in FIG. 20, however, the stopper 30 is disposed on the side of the opened flange 12 of the female member 1, and the regulator 61 is disposed on the inner side of the receiving tube 10 of the female member 1. In the quick connector of the Sixth Preferred Embodiment, the tapered walls 34 of the stopper 30 are engaged with the engager projection 20 of the male member 2 at the smaller diameter ends 34a, and they are directly and uniformly brought into contact with and engaged with the inner end surface of the opened flange 12 of the receiving tube 10 at the larger diameter ends 34b around the periphery. As a result, when a reaction force is exerted between the female member 1 and the male member 2 in the axial direction during the service, the engager member 3 can be hardly displaced in the axial direction so that the female member 1 and the male member 2 can be connected stably.

Seventh Preferred Embodiment

A quick connector according to a Seventh Preferred Embodiment of the present invention will be hereinafter described with reference to FIGS. 21 through 25. The constructions, the operations and the advantageous effects of the Seventh Preferred Embodiment are identical with those of the Sixth Preferred Embodiment basically.

Figure 21:
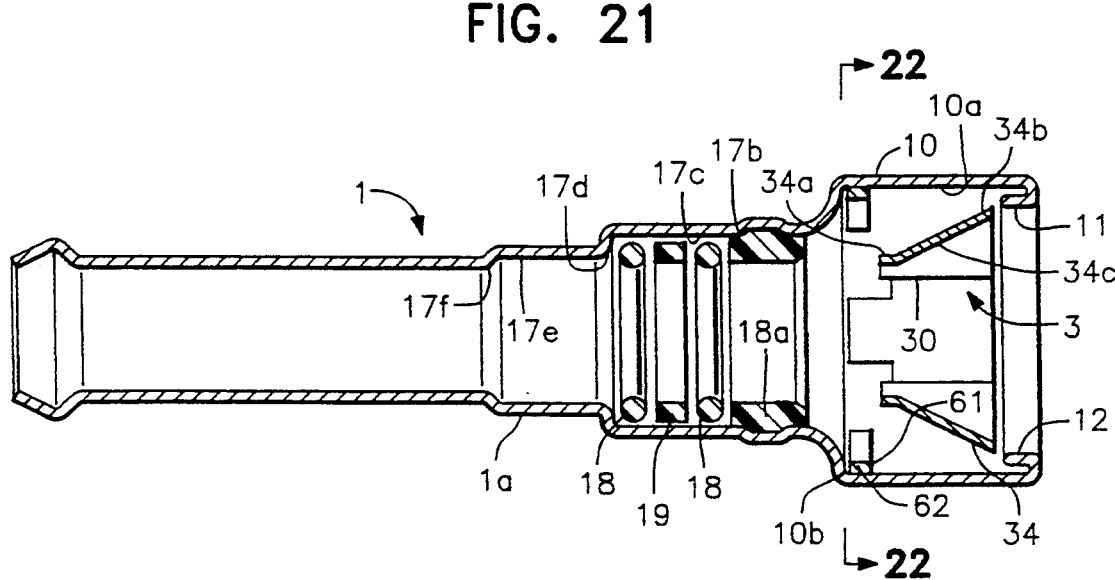
FIG. 21 is a cross-sectional view for showing the female member according to the Seventh Preferred Embodiment.
Figure 22:
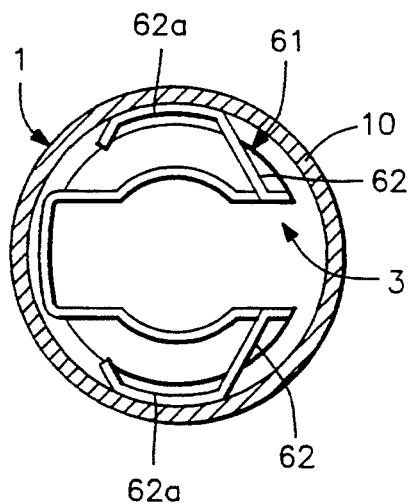
FIG. 22 is a Y5 to Y5 cross-sectional view of FIG. 21.
Figure 23:
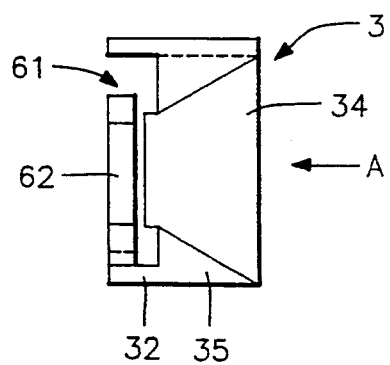
FIG. 23 is a side view for showing the engager member according to the Seventh Preferred Embodiment.
Figure 24:
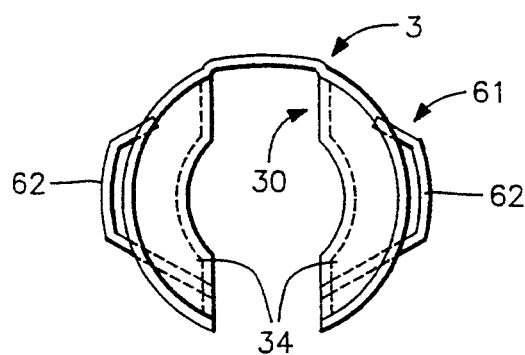
FIG. 24 is a A-view front view of the engager member according to the Seventh Preferred Embodiemnt.
Figure 25:
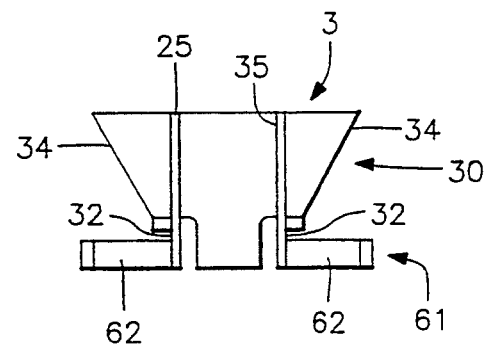
FIG. 25 is a base view for showing the engager member according to the Seventh Preferred Embodiment.

As illustrated in FIG. 21, however, the female member 1 is formed integrally, and it is provided with the receiving tube 10 at an end of the shaft 1a in the axial direction, receiving tube 10 which is formed by increasing the diameter at the end. The engager member 3 is disposed in the receiving tube 10 through the opened flange 12 by deforming the stopper 30 and the regulator 61 so as to decrease the diameters. As best shown in FIG. 22, the regulator 61 of the stopper 30 includes two arms 62 projecting in the centrifugal directions and formed substantially in a letter "U" shape. As best shown in FIGS. 23 and 25, the arms 62 are formed integrally with the stopper 30. Specifically speaking, on the side of the smaller diameter ends 34a of the tapered walls 34 of the stopper 30, the arms 62 are connected to the stopper 30 by way of two linkages 32 which are extended from the projections 35 at the leading ends of the tapered walls 34 in the axial direction. Further, as illustrated in FIG. 21, the snap retainer ring 18 is made from resin, and it is fixed in the female member 1 by press-fitting itself into the ring-shaped groove 17b of the female member 1. Furthermore, as also illustrated in FIG. 21, the annular-shaped concave 10a is formed in a stepped surface 10b on the innermost side.

Eighth Preferred Embodiment

A quick connector according to an Eighth Preferred Embodiment of the present invention will be hereinafter described with reference to FIGS. 26 through 31. The constructions, the operations and the advantageous effects of the Eighth Preferred Embodiment are identical with those of the Sixth Preferred Embodiment basically.

Figure 26:
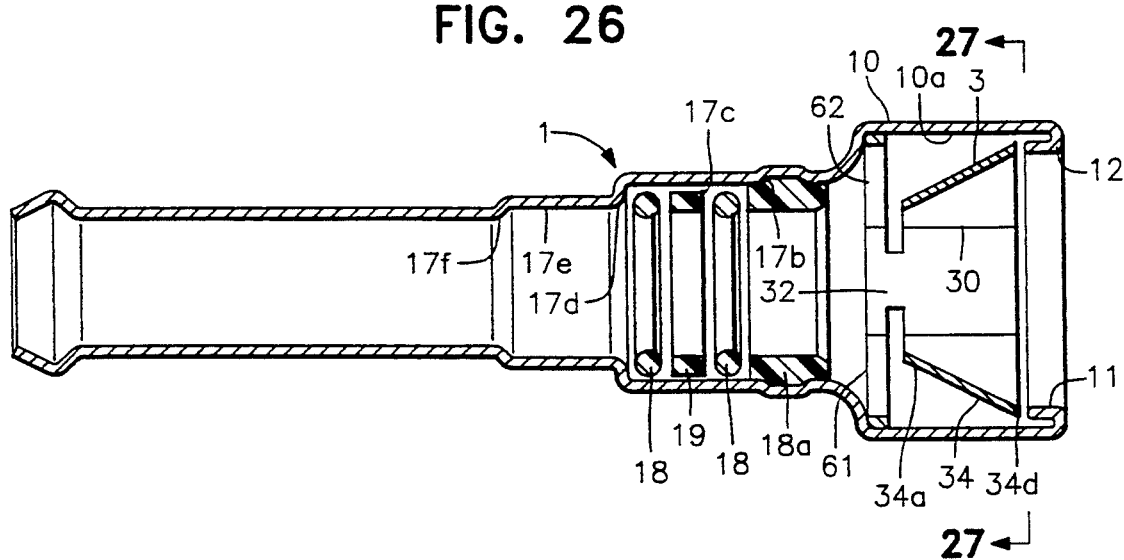
FIG. 26 is a cross-sectional view for showing the female member according to the Eighth Preferred Embodiment.
Figure 27:
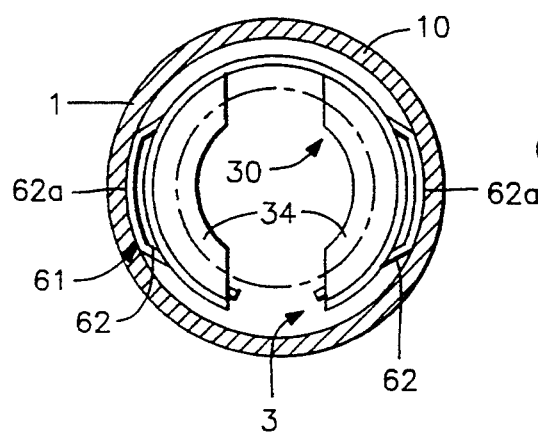
FIG. 27 is a Y6 to Y6 cross-sectional view of FIG. 26.
Figure 28:
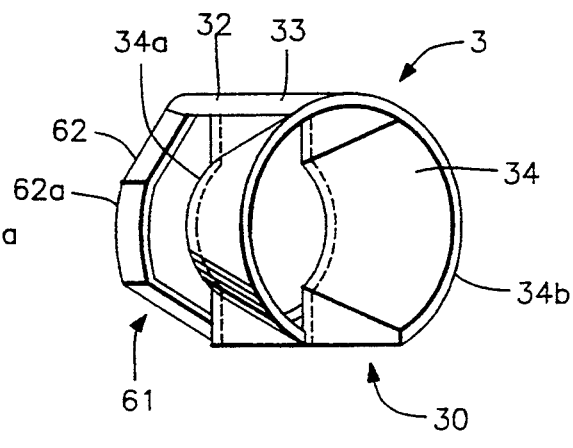
FIG. 28 is a diagonal view for showing the engager member according to the Eighth Preferred Embodiment.

As illustrated in FIG. 26, however, the female member 1 is formed integrally, and the engager member 3 is disposed in the receiving tube 10 through the opened flange 12 by deforming the stopper 30 and the regulator 61 so as to decrease the diameters. As best shown in FIGS. 27 and 28, the regulator 61 of the stopper 30 includes two arms 62 projecting in the centrifugal directions and formed substantially in a letter "U" shape. As best shown in FIGS. 28 and 29, the arms 62 are formed integrally with the stopper 30. Specifically speaking, on the side of the smaller diameter ends 34a of the tapered walls 34 of the stopper 30, the arms 62 are connected to the stopper 30 by way of a linkage 32 which is extended from an intermediate linkage 33 disposed on the stopper 30 in the axial direction. In the quick connector of the Eighth Preferred Embodiment, the stopper 30 of the engager member 3 is disposed on the inner side of the opened flange 12, and the regulator 61 is disposed on the inner side of the receiving tube 10 in the same manner as the Sixth Preferred Embodiment described above. Accordingly, the tapered walls 34 of the stopper 30 are engaged with the engager projection 20 of the male member 2 at the smaller diameter ends 34a, and they are directly and uniformly brought into contact with and engaged with the inner end surface of the opened flange 12 of the receiving tube 10 at the larger diameter ends 34b around the periphery. As a result, when a reaction force is exerted between the female member 1 and the male member 2 in the axial direction during the service, the engager member 3 can be hardly displaced in the axial direction so that the female member 1 and the male member 2 can be connected stably.

Ninth Preferred Embodiment

A quick connector according to a Ninth Preferred Embodiment of the present invention will be hereinafter described with reference to FIGS. 32 through 39. The quick connector comprises the female member 1 and the male member 2 whose constructions are identical with those of the Seventh Preferred Embodiment, and they will not be described herein.

As illustrated in FIGS. 36 through 39, the engager member 3 has a "C"]ring-shaped overall configuration, and it is formed by cutting and bending a thin leaf spring made of stainless steel. The engager member 3 includes a "C" ring-shaped larger diameter end 71, a pair of arc-shaped tapered walls 72, 72, a linkage 73, and a pair of leading end (or cut-off end) walls 74, 74.

The "C" ring-shaped larger diameter end 71 of the engager member 3 has an outside diameter which is larger than the opened diameter (i.e., the inside diameter) of the opened flange 12 of the female member 1 and which is substantially equal to the inside diameter of the annular-shaped concave 10a. When the engager member 3 is accomodated in the annular-shaped concave 10a of the female member 1, the "C" ring-shaped larger diameter end 71 of the engager member 3 is brought into contact with the inside end surface of the opened flange 12 and the inner peripheral surface of the annular-shaped concave 10a.

The pair of the arc-shaped tapered walls 72, 72 of the engager member 3 are formed integrally with the "C" ring-shaped larger diameter end 71 on the larger diameter side, and they reduce the diameter coaxially with the "C" ring-shaped larger diameter end 71 as they extend in the direction toward the inner side of the female member 1. The pair of the arc-shaped tapered walls 72, 72 have an inside diameter which is smaller than the outside diameter of the engager projection 20 of the male member 2 on the side of the smaller diameter ends, and they have an inside diameter which is substantially equal to the outside diameter of the engaging tube 21 of the male member 2 on the side of the smaller ends. When the male member 2 is connected to the female member 1, the pair of the arc-shaped tapered walls 72, 72 are engaged with the engager projection 20 of the male member 2 and brought into contact with the outer peripheral surface of the male member 2 at the smaller diameter ends.

The linkage 73 of the engager member 3 is extended from the "C" ring-shaped larger diameter end 71 to the smaller diameter ends of the arc-shaped tapered walls 72, 72 so as to link the pair of the arc-shaped tapered walls 72, 72. The linkage 73 includes an arc-shaped top wall 73a, and a pair of linkage walls 73b, 73b formed in a substantially triangular plate. The arc-shaped top wall 73a is brought into contact with the inner peripheral surface of the annular-shaped concave 10a which has the inside diameter substantially equal to the outside diameter of the "C" ring-shaped larger diameter end 71. The linkage walls 73b, 73b are formed by bending the arc-shaped top wall 73a at the circumferential ends (or the diametric ends), and they are extended parallel each other so that they are connected to one of the circumferential ends (or the cut-off ends) of the pair of the arc-shaped tapered walls 72, 72. When the engager member 3 is accommodated in the annular-shaped concave 10a of the female member 1, the whole surface of the arc-shaped top wall 73a is brought into contact with the inner peripheral surface of the annular-shaped concave 10a.

The pair of the leading end walls 74, 74 of the engager member 3 are extended from the circumferential ends (or the cut-off ends) of the "C" ring-shaped larger diameter end 71 to the smaller diameter ends of the arc-shaped tapered walls 72, 72, and they are connected to another one of the circumferential ends (or the cut-off ends) of the pair of the arc-shaped tapered walls 72, 72. The leading end walls 74, 74 are formed in a substantially triangular plate, and they are extended symmetrically each other and parallelly with the linkage walls 73b, 73b. The pair of the leading end walls 74, 74 include a pair of peripheral end contacts 74a, 74a. When the engager member 3 is accommodated in the annular-shaped concave 10a of the female member 1, the peripheral end contacts 74a, 74a are brought into contact with the inner periperal surface of the annular-shaped concave 10a.

When the engager member 3 is put into the free state, namely before the engager member 3 is inserted into the female member 1, the outside diameter of the "C" ring-shaped larger diameter end 71 of the engager member 3 is set so that it is slightly larger than the annular-shaped concave 10a of the female member 1. The engager member 3 is inserted into the annular-shaped concave 10a through the opened flange 12 while its diameter is reduced by elastically deforming, namely by approaching the pair of the leading end walls 74, 74 each other. Then, the engager member 3 is put back into its original diameter by its own resilient force when the insertion is completed, and thereby it is engaged in the annular-shaped concave 10a with the outer peripheral surfaces of the arc-shaped top wall 73a and the pair of the peripheral end contacts 74a, 74a brought into contact with the inner peripheral surface of the annular-shaped concave 10a.

Figure 33:
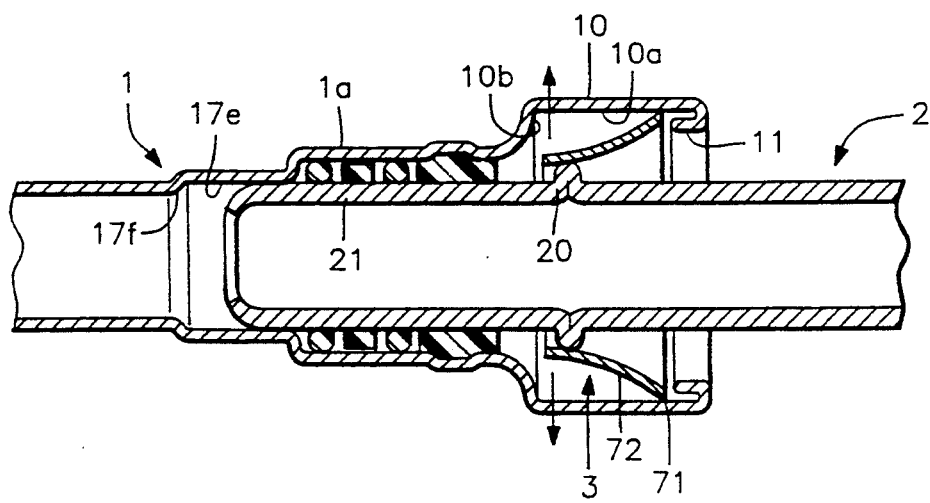
FIG. 33 is a cross-sectional view for showing the condition that the male member is inserted into the female member according to the Ninth Preferred Embodiment.

The operations of the quick connector of the Ninth Preferred Embodiment will be hereinafter described together with the usage. With respect to the female member 1 holding the engager member 3 therein as described above, the engaging tube 21 of the male member 2 is inserted into the annular-shaped concave 10a of the receiving tube 10 of the female member 1 through the opened flange 12, and the engager projection 20 of the male member 2 is pressed against the inner peripheral surfaces of the pair of the arc-shaped tapered walls 32, 32. Accordingly, the pair of the tapered walls 34, 34 are deformed elastically so as to warp radially outwardly at the smaller diameter ends as illustrated in FIG. 33. At this moment, the engager member 3 is brought into contact with the annular-shaped concave 10a at the "C" ring-shaped larger diameter end 71, at the arc-shaped top wall 33a of the linkage 73 and at the peripheral end contacts 74a, 74a of the pair of the leading walls 74, 74. Thus, the engager member 3 can be held securely in the annular-shaped concave 10a of the female member 1 and concentrically therewith. Further, the engager member 3 can be prevented from moving into the inside of the female member 1 because the linkage 73 and the leading ends 74 are brought into contact with the stepped surface 10b of the annular-shaped concave 10a at the ends, and thereby it cannot be displaced in the radial directions and in the axial directions at all when the pair of the arc-shaped tapered walls 72, 72 are deformed elastically by the projection 20 of the male member 2. Accordingly, the insertion of the male member 2 into the female member 1 can be carried out with a remarkably good operability.

Figure 34:
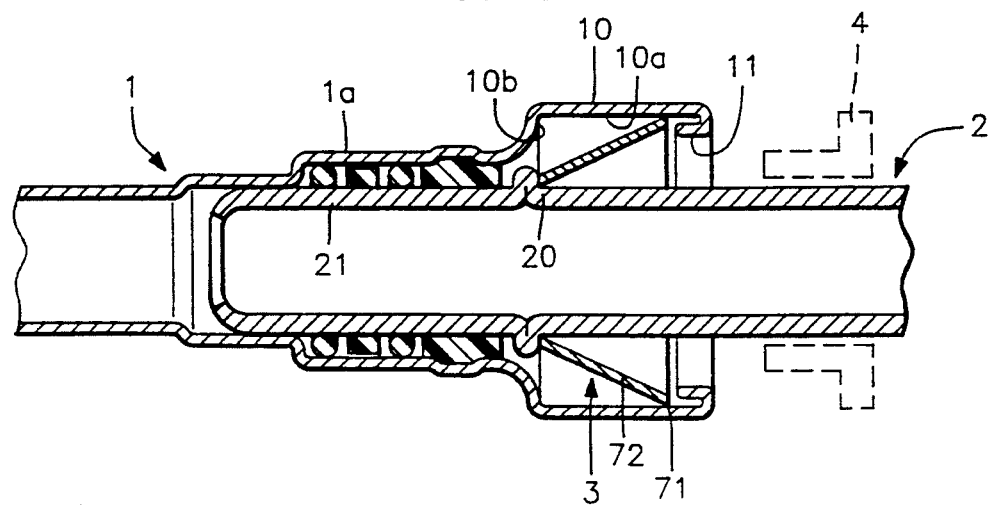
FIG. 34 is a cross-sectional view for showing the condition that the male member is connected to the female member according to the Ninth Preferred Embodiment.
Figure 36:
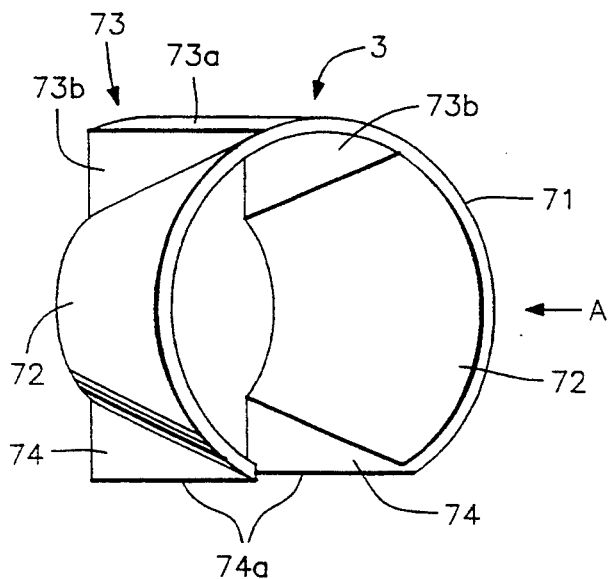
FIG. 36 is a diagonal view for showing the engager member according to the Ninth Preferred Embodiment.
Figure 37:
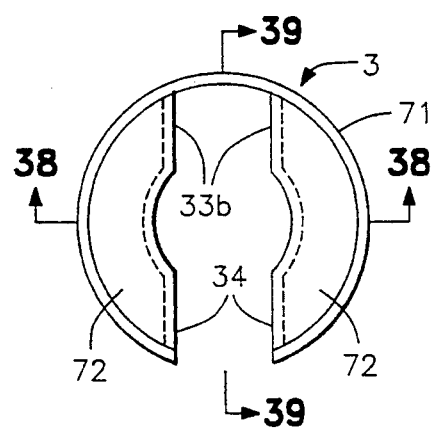
FIG. 37 is a A-view of FIG. 5 and a front view for showing the engager member.
Figure 38:
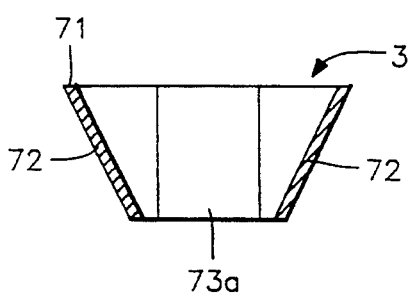
FIG. 38 is a B to B cross-sectional view of FIG. 6 for showing the engager member.
Figure 39:
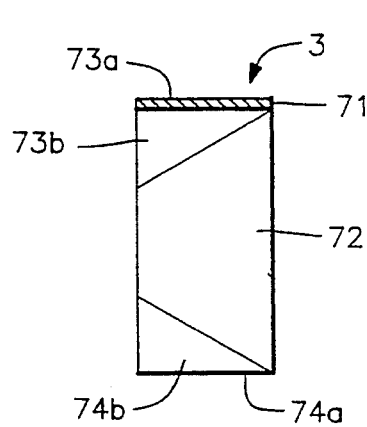
FIG. 39 is a C to C cross-sectional view of FIG. 6 for showing the engager member.

When the male member 2 is further inserted into the female member 1, the engager projection 20 of the male member 2 goes over the engager member 3, and it is disposed in the inner side of the female member 1 with respect to the engager member 3. Then, the pair of the tapered walls 72, 72 which have been elastically deformed radially outwardly are restored to the original shapes by their own resilient forces as illustrated in FIG. 34. Accordingly, the male member 2 is engaged with the smaller diameter ends of the arc-shaped tapered walls 72, 72 of the engager member 3 at the engager projection 20, the female member 1 is engaged with the "C" ring-shaped larger diameter end 71 of the engager member 3 at the inside end surface of the opened flange 12 and the inner peripheral surface of the annular-shaped concave 10a, and the engager member 3 is engaged with the inner peripheral surface of the annular-shaped concave 10a of the female member 1 at the arc-shaped top wall 73a of the linkage 73 and at the peripheral end contacts 74a, 74a of the leading ends walls 74 and 74. As a result, the male member 2 is connected to the female member 1.

When the female member 1 and the male member 2 are connected, the engager member 3 adapted for connecting them is accommodated in the annular-shaped concave 10a of the female member 1. Hence, the engager member 3 hardly collides or interferes with the other component members.

The male member 2 and the female member 1 can be securely prevented from moving relatively in the axial directions because the engager member 3 is engaged with the engager projection 20 of the male member 2 at the smaller ends of the pair of the arc-shaped tapered walls 72, 72, and because the engager member 3 is engaged with the inside end surface of the opened flange 12 of the female member 1 at the "C" ring-shaped larger diameter end 71. Further, on the smaller diameter ends side of the arc-shaped tapered walls 72, 72 of the engager member 3, the smaller diameter ends of the arc-shaped tapered walls 72, 72 are held in the directions perpendicular to the axial direction between the linkage wall 73b of the linkage 73 and the leading walls 74, 74 which are regulated by the inner peripheral surface of the annular-shaped concave 10a of the female member 1. As a result, when a large axial force is exerted to the female member 1 and the male member 2 so as to separate them apart, the engager member 3 can adequately receive the large axial force from the engager projection 20 of the male member 2 at the smaller diameter ends of the arc-shaped tapered walls 72, 72 so that it is not buckled at all.

In addition, the engager member 3 is brought into contact with the inner peripheral surface of the annular-shaped concave 10a of the female member 1 at the "C" ring-shaped larger diameter ends 71, the arc-shaped top wall 73a of the linkage 73 and the peripheral end contacts 74a, 74a of the pair of the leading end walls 74, 74 thereof, and the pair of the arc-shaped tapered walls 72, 72 are regulated in the directions perpendicular to the axial direction by the linkage wall 73b of the linkage 73 and the leading walls 74, 74. Consequently, the engager member 3 cannot be moved idly or loosened.

Hence, in accordance with the quick connector of the Ninth Preferred Embodiment, the female member 1 and the male member 2 can be firmly connected and held together by way of the engager member 3.

Further, in the quick connector of the Ninth Preferred Embodiment, the outer configuration of the "C" ring-shaped larger diameter end 71 is formed in a simple circle. Thus without providing a cut-off to the opened flange 12 of the female member 1, the engager member 3 can be freely inserted into the female member 1 through the opened flange 12 by deforming itself so as to reduce the diameter. Accordingly, the engager member 3 can be disposed in the female member 1 with an improved operability. Furthermore, in the quick connector, the opened flange 12 of the female member 1 can be formed in a simple circle as illustrated in FIG. 35. Accordingly, the female member 1 is manufactured with a reduced cost.

When separating the male member 2 and the female member 1, a releasing jig 4 is moved into the inner side of the female member 1 as illustrated in FIG. 34, and it is pressed onto the inner peripheral surfaces of the arc-shaped tapered walls 72, 72 in order to elastically deform them. Accordingly, the engager projection 20 and the arc-shaped tapered walls 74, 74 are disengaged. Under the disengagement, the male member 2 and the female member 1 can be separated apart relatively.

Figure 32:
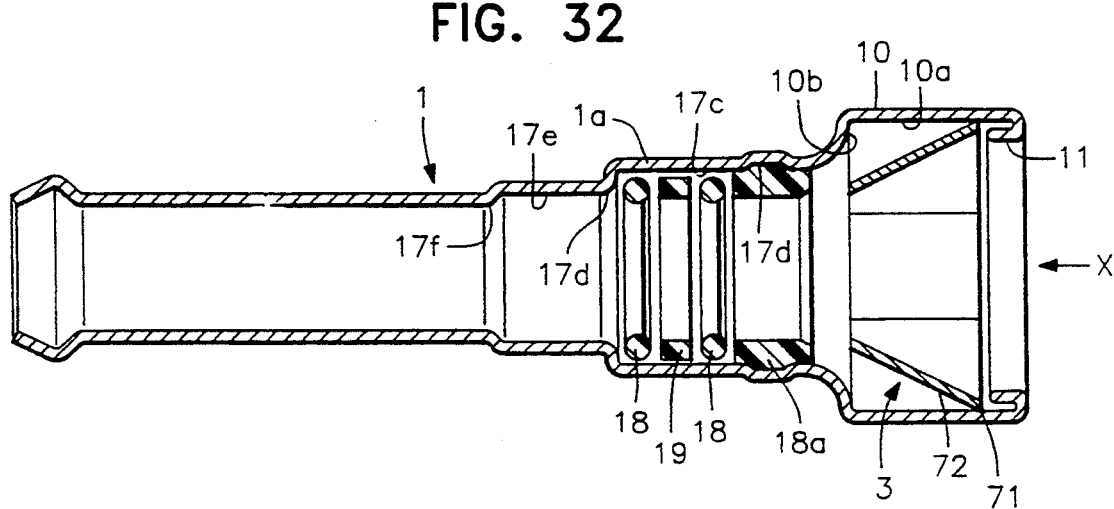
FIG. 32 is a cross-sectional view for showing the female member of the quick connector according to the Ninth Preferred Embodiment.

As can be seen from FIG. 32, after the male member 2 and the female member 1 are connected in the quick connector of the Ninth Preferred Embodiment, the sealing is maintained by the sealing rings 18, 18 in the boundary area between the male member 2 and the female member 1, a fluid can be transferred by way of the tubular male member 2 and the tubular female member 1.

Tenth Preferred Embodiment

A quick connector according to a Tenth Preferred Embodiment of the present invention will be hereinafter described with reference to FIGS. 40 and 41. The constructions, the operations and the advantageous effects of the Tenth Preferred Embodiment are identical with those of the Ninth Preferred Embodiment basically except that an engager member 3' is modified in the configuration.

Figure 40:
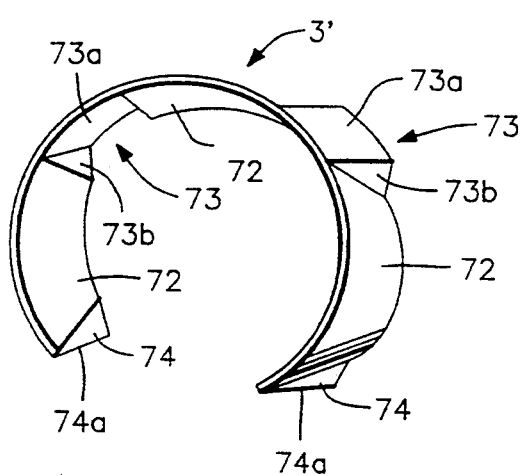
FIG. 40 is a diagonal view for showing other embodiment of the engager member according to the Tenth Preferred Embodiment.

As illustrated in FIG. 40, the engager member 3' has the same constructions as those of the engager member 3 of the Ninth Preferred Embodiment except that it includes three arc-shaped tapered walls 72 instead of the two of them provided to the engager member 3 of the Ninth Preferred Embodiment, and that it includes two linkages 73, 73 instead of the one provided thereto.

The quick connector of the Tenth Preferred Embodiment operates and effects advantages similarly to the Ninth Preferred Embodiment.

Figure 41:
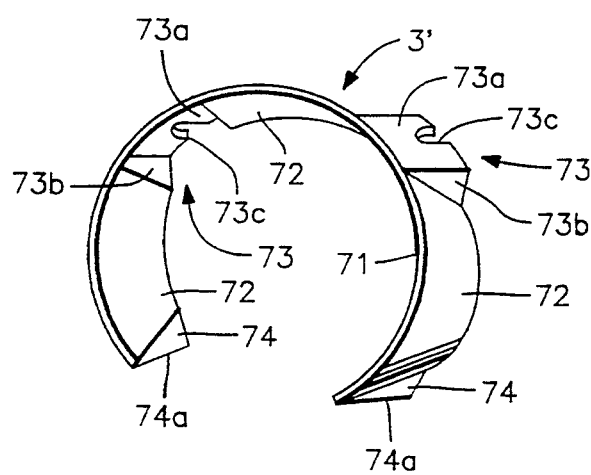
FIG. 41 is a diagonal view for showing other embodiment of the engager member according to the Tenth Preferred Embodiment.
Figure 42:
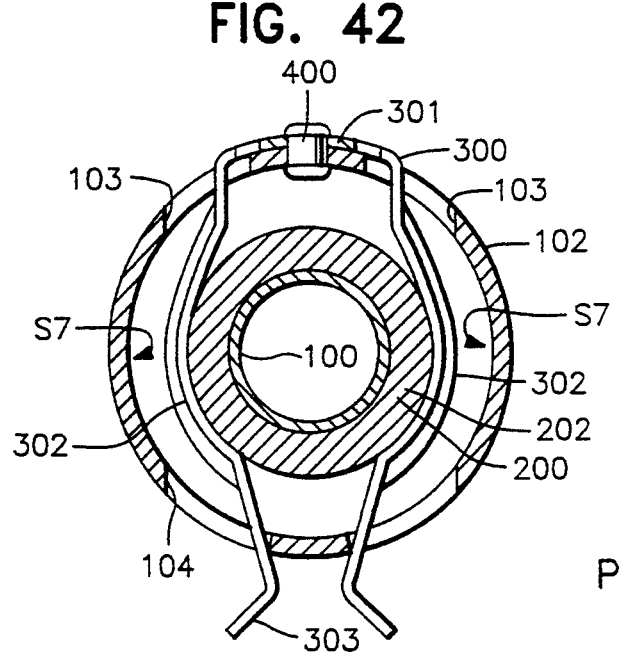
FIG. 42 is a horizontal cross-sectional view for showing the condition that the engager member according to the conventional quick connector is used.
Figure 43:
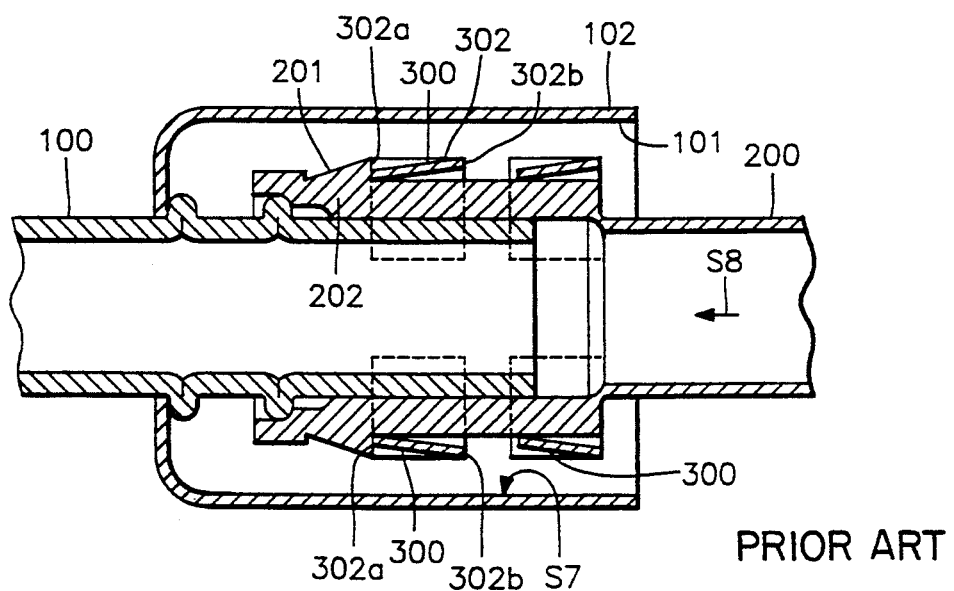
FIG. 43 is a cross-sectional view for showing that the engager member according to the conventional quick connector is used.
Figure 46:
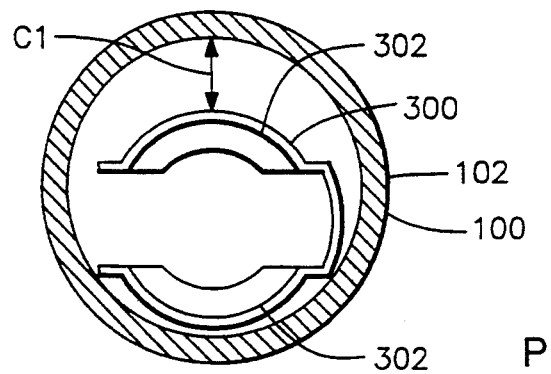
FIG. 46 is a cross-sectional view for showing the related quick connector.
Figure 44:
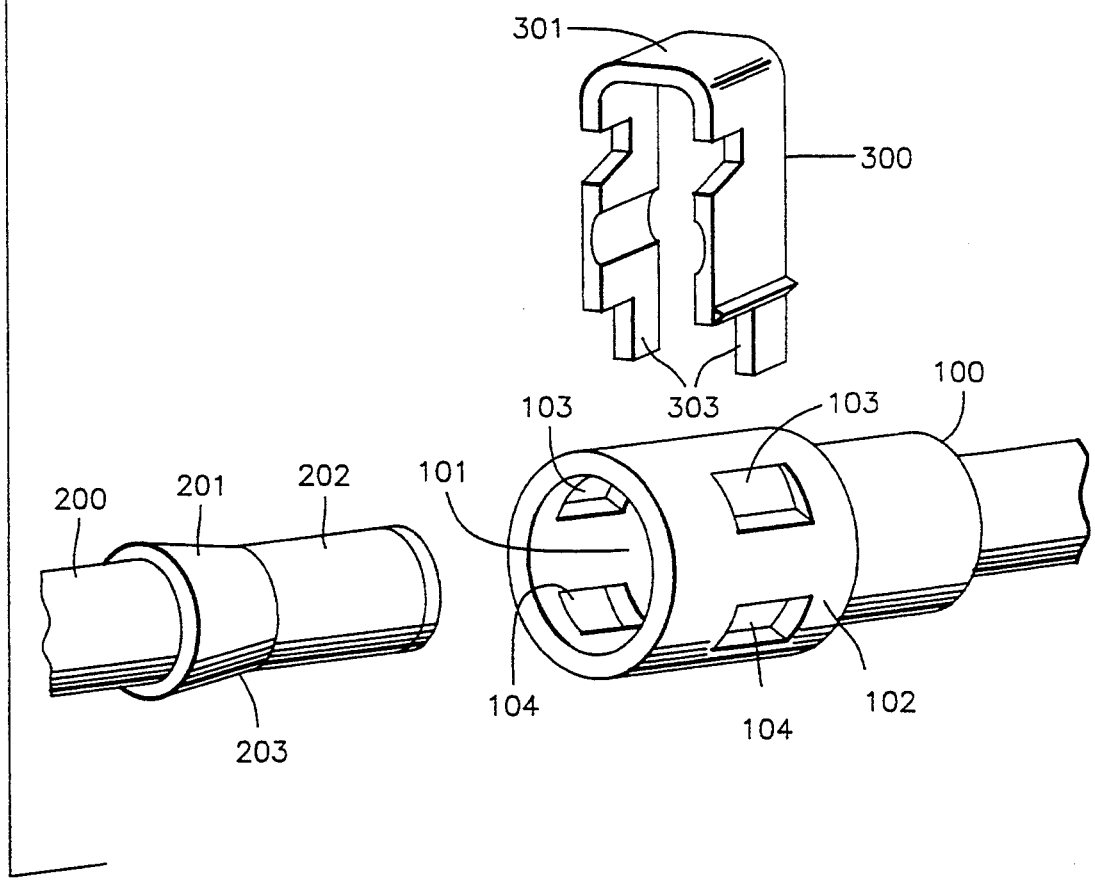
FIG. 44 is a decomposed diagonal view for showing the conventional quick connector.
Figure 45:
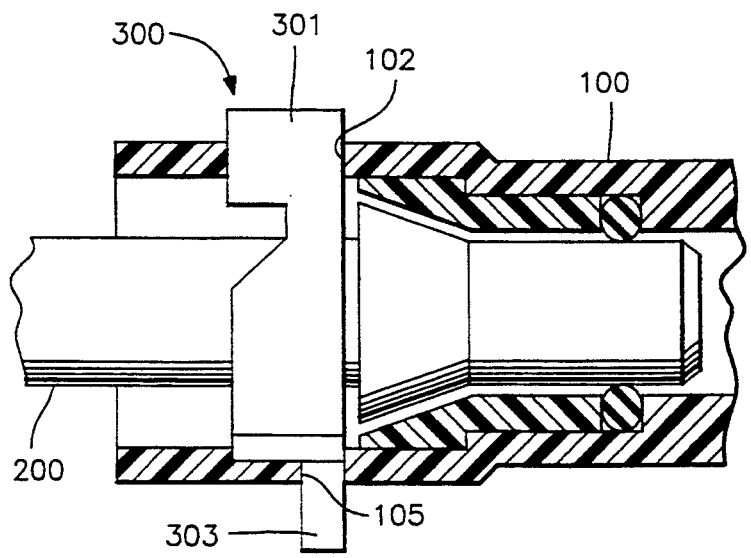
FIG. 45 is a cross-sectional view for showing the conventional quick connector.

Further, as illustrated in FIG. 41, in the engager member 3', a groove 73c can be formed in the arc-shaped top walls 73a, 73a of the linkages 73, 73, groove 73c which extends from the smaller ends of the arc-shaped tapered walls 72, 72 to the larger diameter ends in the axial direction. With the grooves 73c, the engager member 3' can be upgraded in the overall diameter reducing ability. As a result, the engager member 3' can be disposed in the annular-shaped concave 10a through the opened flange 12 of the female member 1 with a further improved operability.

Furthermore, in the quick connectors of the Ninth and Tenth Preferred Embodiments, the top walls 73a of the linkage 73 of the engager member 3 or 3' are formed in an arc. However, the present invention is not limited thereto. For instance, the top walls 73a can be formed in a flat surface, and they are can be brought into contact with the inner peripheral surface of the annular-shaped concave 10a at the circumferential ends (or the diametric ends).

Moreover, it goes without saying that the female member 1 can be formed of resin such as nylon, polypropylene, or the like, and that the engager member 3 and 3' can be formed of resin having a spring-like elasticity, e.g., nylon, or the like.

Having now fully described the present invention, it will be apparent to one of ordinary skill in the art that many changes and modifications can be made thereto without departing from the spirit or scope of the present invention as set forth herein including the appended claims.

What is claimed is:

1. A quick connector comprising:
a tubular-shaped female member having an opened flange which is projected in the centripetal direction and installed at an open end in an axial direction, and an annular-shaped concave portion which is adjacent to and inside said opened flange and whose inner diameter is larger than that of said opened flange;
a tubular-shaped male member which has a ring-shaped engager projection projected in the centrifugal direction at a predetermined distance from a top end, and which is inserted into said annular-shaped concave portion through said opened flange;

an engager member which is supported in said annular-shaped concave portion of said female member, and having a spring elasticity for connecting said female member and said male member inserted into said annular-shaped concave portion;

said engager member comprising:

a "C"-shaped ring stopper whose diameter can be increased in said annular-shaped concave portion, and which has plural tapered walls arranged in a circumferential direction, and tapered from said opened flange to an inner side of said female member, and having smaller diameter ends having an inner diameter smaller than an outer diameter of said engager projection of said male member to engage said engager projection, and having the larger diameter ends having a diameter larger than that of said opened flange of said female member to face the inside end surface of said opened flange and which has at least one linkage wall extending in an axial direction to connect said tapered walls;

a regulator which is lined with said stopper in an axial direction, and which is projected in the centrifugal direction over said larger diameter ends of said stopper, and which is brought into contact with an inner peripheral surface of said annular-shaped concave portion to regulate the displacement in a radial direction of said stopper; and a linkage for connecting said stopper and said regulator.

2. A quick connector according to claim 1, wherein said female member comprises a first tube including said annular-shaped concave portion and said opened flange, and a second tube which is detachably connected to said first tube.

3. A quick connector according to claim 1, wherein said regulator is ring-shaped.

4. A quick connector comprising:

a tubular-shaped female member having an opened flange which is projected in the centrifugal direction and installed at an open end in an axial direction, and an annular-shaped concave portion which is adjacent to and inside said opened flange and whose inner diameter is larger than that of said opened flange;

a tubular-shaped male member which has a ring-shaped engager projection projected in the centrifugal direction at a predetermined distance from a top end, and which is inserted into said annular-shaped concave portion through said opened flange;

an engager member which is supported in said annular-shaped concave portion of said female member, and having a spring elasticity for connecting said female member and said male member inserted into said annular-shaped concave portion;

said engager member comprising:

a "C"-shaped ring stopper whose diameter can be increased in said annular-shaped concave portion, and which has plural tapered walls arranged in a circumferential direction, and tapered from said opened flange to an inner side of said female member, and having smaller diameter ends having an inner diameter smaller than an outer diameter of said engager projection of said male member to engage said engager projection, and having the larger diameter ends having a diameter larger than that of said opened flange of said female member to face the inside end surface of said opened flange and which has at least one linkage wall extending in an axial direction to connect said tapered walls;

a regulator having a pair of arms whose diameter can be reduced, and which is lined with said stopper in an axial direction, and which is projected in the centrifugal direction over said larger diameter ends of said stopper, and which is brought into contact with an inner peripheral surface of said annular-shaped concave portion to regulate the displacement in a radial direction of said stopper; and a linkage for connecting said stopper and said regulator; and said engager member being inserted through said opened flange of said female member by reducing a diameter of said stopper and said regulator.

5. A quick connector according to claim 4, wherein said female member is formed integrally.

6. A quick connector according to claim 4, wherein said regulator of said engager member comprises a pair of "V" shaped arms which are projected in the centrifugal direction and in which leading ends are brought into contact with the inner peripheral surface of said annular-shaped concave, and an intermediate linkage which is connected to each arm.

7. A quick connector according to claim 6, wherein each end of said "V" shaped arms of said engager member has a curved portion.

8. A quick connector according to claim 4, wherein said linkage of said engager member is bent so that it is drawn in toward said stopper to reduce a clearance in the axial direction between said stopper and said regulator.

9. A quick connector according to claim 4, wherein each leading end of said arms of said engager member has a grip which extends in an axial direction so as to project from said opened flange of said female member, and said engager member can be taken out of said annular-shaped concave portion of said female member by moving both grips and reducing a diameter of said arms.

10. A quick connector according to claim 4, wherein said stopper is disposed on a side of said opened flange of said female member, and said regulator is disposed on the inner side of said female member, and said stopper is engaged with said engager projection of said male member at the smaller diameter ends, and it is engaged with the inner end surface of said opened flange of said female member at the larger diameter ends.

11. A quick connector according to claim 10, wherein said linkage is installed in the circumferential direction to each end of said stopper at the smaller diameter end.

12. A quick connector according to claim 10, wherein said linkage is installed in the circumferential direction to an intermediate portion of said stopper at the smaller diameter end.

13. A quick connector comprising:

a tubular-shaped female member having an opened flange which is projected in the centripetal direction and installed at an open end in an axial direction, and an annular-shaped concave portion which is adjacent to and inside said opened flange and whose inner diameter is larger than that of said opened flange;

a tubular-shaped male member which has a ring-shaped engager projection projected in the centrifugal direction at a predetermined distance from a top end, and which is inserted into said annular-shaped concave portion through said opened flange;

an engager member which is supported in said annular-shaped concave portion of said female member, and having a spring elasticity for connecting said female member and said male member inserted into said annular-shaped concave portion;

said engager member comprising:

a "C"-shaped ring larger diameter end which is located opposed to an inside end surface of said opened flange of said female member, and which is brought into contact with the inner peripheral surface of said annular-shaped concave portion, and which has an outer diameter larger than an opening diameter of said opened flange and approaching a size equal to an inner diameter of said annular-shaped concave portion;

plural tapered walls arranged in a circumferential direction, and which are tapered coaxially with respect to said "C"-shaped ring larger diameter ends from said "C"-shaped ring larger diameter ends to the inner side of said female member, and which have smaller diameter ends with an inner diameter smaller than the outer diameter of said engager projection of said male member to engage said engager projection;

at least one linkage for extending from said "C"-shaped larger diameter ends to said smaller diameter ends to connect said tapered walls and having a top wall extending from said "C"-shaped ring larger diameter ends to said smaller diameter ends parallel to a longitudinal axis and at least peripheral ends are in contact with the inner peripheral surface of said annular-shaped concave portion having a diameter approaching a size equal to the outer diameter of said "C"-shaped ring larger diameter ends, and a pair of linkage walls extending downwardly and in parallel from said peripheral ends of said top wall and each linkage wall being connected to each peripheral end of said tapered walls; and a pair of leading walls extending from said "C"-shaped ring larger diameter ends to said smaller diameter ends and each of said leading walls is connected to a peripheral end of said tapered walls, and peripheral end contacts extending from said "C"-shaped ring larger diameter ends to said smaller diameter ends being in contact with the inner peripheral surface of said annular-shaped concave portion whose diameter is equal to the outer diameter of said "C"-shaped ring larger diameter ends.

14. A quick connector according to claim 13, wherein said female member is formed integrally.

15. A quick connector according to claim 13, wherein said tapered walls are arc-shaped.

16. A quick connector according to claim 13, wherein said top wall of said linkage is arc-shaped.

17. A quick connector according to claim 13, wherein said engager member includes three tapered walls and two linkages.

18. A quick connector according to claim 17, wherein said linkage has a groove extending in an axial direction.

* * * * *